US007207083B2

(12) United States Patent
Hayashi et al.

(10) Patent No.: US 7,207,083 B2
(45) Date of Patent: Apr. 24, 2007

(54) ELECTRIC VACUUM CLEANER

(75) Inventors: Shoji Hayashi, Ushiku (JP); Yukiji Iwase, Ushiku (JP); Yasuyuki Hiruta, Hitachi (JP); Kyouichi Kanno, Hitachi (JP); Susumu Sato, Takahagi (JP); Naofumi Kitagawa, Hitachi (JP); Naruhiko Suzuki, Hitachi (JP); Yasunori Kotaka, Hitachi (JP); Hirofumi Tanaka, Shiroyama (JP); Koichi Umezawa, Tokyo (JP)

(73) Assignee: Hitachi Home & Life Solutions, Inc., Tokyo (JP)

( * ) Notice: Subject to any disclaimer, the term of this patent is extended or adjusted under 35 U.S.C. 154(b) by 311 days.

(21) Appl. No.: 10/372,087

(22) Filed: Feb. 25, 2003

(65) Prior Publication Data

US 2003/0226232 A1 Dec. 11, 2003

(30) Foreign Application Priority Data

Jun. 11, 2002 (JP) ............................ 2002-169405
Oct. 21, 2002 (JP) ............................ 2002-305265

(51) Int. Cl.
*A47L 9/16* (2006.01)
*B01D 45/12* (2006.01)

(52) U.S. Cl. ......................... 15/347; 15/327.1; 15/353; 55/337; 55/429; 55/DIG. 3

(58) Field of Classification Search ............... 15/327.1, 15/327.2, 327.3, 327.6, 327.7, 347, 350–353; 55/337, 429, DIG. 3
See application file for complete search history.

(56) References Cited

U.S. PATENT DOCUMENTS

| | | | | | |
|---|---|---|---|---|---|
| 2,226,630 | A * | 12/1940 | McCord | ...................... | 55/305 |
| 3,618,302 | A * | 11/1971 | Cornett | ........................ | 55/304 |
| 6,090,174 | A * | 7/2000 | Douma et al. | ................ | 55/337 |
| 6,332,239 | B1 * | 12/2001 | Dubos et al. | ................. | 15/353 |
| 6,406,505 | B1 * | 6/2002 | Oh et al. | ...................... | 55/337 |
| 2001/0010107 | A1 * | 8/2001 | Bair et al. | ..................... | 15/351 |
| 2001/0018865 | A1 * | 9/2001 | Wegelin et al. | ............... | 95/268 |
| 2001/0029845 | A1 * | 10/2001 | Dyson et al. | ................ | 96/403 |
| 2002/0088079 | A1 * | 7/2002 | Oh | ............................. | 15/352 |
| 2002/0189451 | A1 * | 12/2002 | Morgan | ....................... | 95/268 |
| 2002/0194993 | A1 * | 12/2002 | Gen | ............................ | 95/268 |
| 2003/0106182 | A1 * | 6/2003 | Lee | ............................ | 15/353 |

FOREIGN PATENT DOCUMENTS

| | | | |
|---|---|---|---|
| EP | 0 679 364 | * | 11/1995 |
| JP | 4-288111 | * | 10/1992 |
| JP | 6-52749 | | 7/1994 |
| JP | 2002-051952 | | 2/2002 |
| JP | 2003-153840 | | 5/2003 |
| KR | 2002072007 | * | 9/2002 |

* cited by examiner

*Primary Examiner*—Terrence R. Till
(74) *Attorney, Agent, or Firm*—Antonelli, Terry, Stout and Kraus, LLP.

(57) ABSTRACT

The electric vacuum cleaner is disclosed which includes a main body within which an electric blower and cyclonic separation cylinder are provided. A dust collecting case is provided in communication with the cyclonic separation cylinder to receive dust that has been separated from the inlet tube. The dust collecting case also includes a lifter arranged therein. Air received from the inlet tube is separated such that a portion is passed through the dust collecting case and a communicating passage. The air is subsequently merged and discharge through the electric blower.

7 Claims, 13 Drawing Sheets

ELECTRIC VACUUM CLEANER

BACKGROUND OF THE INVENTION

The present invention is related to an electric vacuum cleaner.

A general electric vacuum cleaner is so constructed to take in dirty air through a floor nozzle, introduce it into the body of the vacuum cleaner, clean the air through a dust collector in the vacuum cleaner, and exhaust the cleaned air to the outside of vacuum cleaner. The dust collector captures dust by filtration using a paper filter or by centrifugal separation using a cylindrical separation cyclone to clean the air.

Japanese Application Patent Laid-Open Publication 2001-29288 discloses an electric vacuum cleaner with a cyclonic separation type dust collector. The dust collector in the electric vacuum cleaner is so constructed that one cyclonic separation cylinder may capture dust in dirty air by centrifugal separation.

Published Japanese translations of PCT international publication for patent applications 10-511880 discloses, as a cyclonic separation dust collector in an electric vacuum cleaner, a dust separator having a cyclonic separation type dust collector comprising outer and inner separation cylinders in which the outer separation cylinder centrifugally removes relatively large particles and the inner separation cylinder centrifugally removes fine particles.

For general home electric vacuum cleaners, it is most important that they are compact and convenient in handling. Further, their dust collector must be smaller and the collected dust must be disposed of easily.

The dust collector having a single cyclonic separation cylinder catches both large and fine dust particles together. This cannot prevent fine dust from being easily raised up when it is taken out from the vacuum cleaner for disposal. Further, the cyclonic separation cylinder must be longer and greater to increase the dust catching ability (or collecting and cleaning ability).

A dual-cylinder type cyclonic dust separator (dust collector) has a combination of inner and outer separation cylinders, but it is very difficult to make it compact and convenient in handling. For general home use, lots of large dust particles are captured and must be frequently taken out from the vacuum cleaner. In this dust separator configuration, it is impossible to take out only the outer cylinder that captured large dust particles for disposal.

SUMMARY OF THE INVENTION

It is therefore an object of the present invention to provide an electric vacuum cleaner with a compact and easy-to-handle cyclonic separation type dust collector.

It is yet a further object of the present invention to provide an electric vacuum cleaner with a compact cyclonic separation type dust collector that has a high dust collecting performance.

It is a still further object of the invention to provide an electric vacuum cleaner having a cyclonic separation type dust collector that can firmly hold the collected fine particles.

The above described objects can be attained by an electric vacuum cleaner equipped with a cyclonic separation cylinder that centrifugally cleans dirty air, wherein the central axis of the cyclonic separation cylinder is made vertical to the floor when the vacuum cleaner cleans the floor and that the cylinder has an inlet to take in dirty air on the bottom of the cylinder, an outlet to exhaust clean air on the bottom of the cylinder, and a communicating port with a dust collecting case on the side of the cylinder.

This invention is characterized in that the electric vacuum cleaner is equipped with a cyclonic separation cylinder including an internal cylinder having an air outlet, a dust collecting case communicating with the cyclonic separation cylinder through an communicating port formed on the cyclonic separation cylinder, a filter in the dust collecting case, and a fluid passage in which the clean air passing through the filter merges with the air discharged from the air outlet.

This invention is further characterized in that dust captured in the dust collecting case is taken out from the electric vacuum cleaner by opening and closing the filter.

This invention is furthermore characterized in that the cyclonic separation cylinder and the dust collecting case are detachable.

This invention is further characterized in that the electric vacuum cleaner is equipped with a cyclonic separation cylinder which takes in dirty air through the bottom of the cylinder from a floor nozzle during vacuum-cleaning, centrifugally de-dusts, then discharges the clean air to the outside of the cylinder though the bottom of the cylinder, and that the axis of the cyclonic separation cylinder is approximately vertical to the floor and the rotating shaft of the motor-driven blower which is an air driving source is horizontal.

This invention is further characterized by an electric vacuum cleaner comprising a motor-driven blower that is an air driving source and a cyclonic separation cylinder that centrifugally removes dust from dirty air taken in from the floor nozzle during vacuum-cleaning and discharges the clean air to the outside of the cylinder and has its axis approximately vertical to the floor, wherein the air inlet port is in the center (when viewed from the top), the cyclonic cleaning means is moved a little to the left or right from the center, and the motor-driven blower is positioned opposite to the cyclonic separation cylinder relative to the center.

This invention is further characterized in that the electric vacuum cleaner is equipped with a dust collecting case which communicates with the cyclonic separation cylinder through an opening formed on the cylinder, that the dust collecting case includes an air filter, and that a fluid passage is formed under the outlet of the cyclone to merge the clean air passing through the filter with the air discharged from the air outlet.

This invention is further characterized in that a filter is provided under the dust collecting case.

This invention is further characterized in that the cyclonic separation cylinder takes in dirty air from the bottom of the cylinder and that the cyclonic separation cylinder has an air outlet that discharges clean air from the cylinder on the bottom of the cylinder, an opening to communicate with the dust collecting case placed close by the cylinder on the top of the cylinder, and a means of opening and closing the filter to take out the accumulated dust from the dust collecting case.

This invention is further characterized in that the electric vacuum cleaner equipped with a cyclonic separation cylinder, that the cyclonic separation cylinder takes in dirty air from the bottom of the cylinder, that the cyclonic separation cylinder has an air outlet that discharges clean air from the cylinder on the bottom of the cylinder, and an opening to communicate with the dust collecting case placed close by the cylinder on the top of the cylinder, that the center axis of the cyclonic separation cylinder is a little slanted leftward or rightward from the center of the electric vacuum cleaner (when viewed from the front of the cleaner), and that the dust collecting case is a truncated pyramid with its wider end down.

BRIEF DESCRIPTION OF THE INVENTION

Embodiment 1

Figure 1:
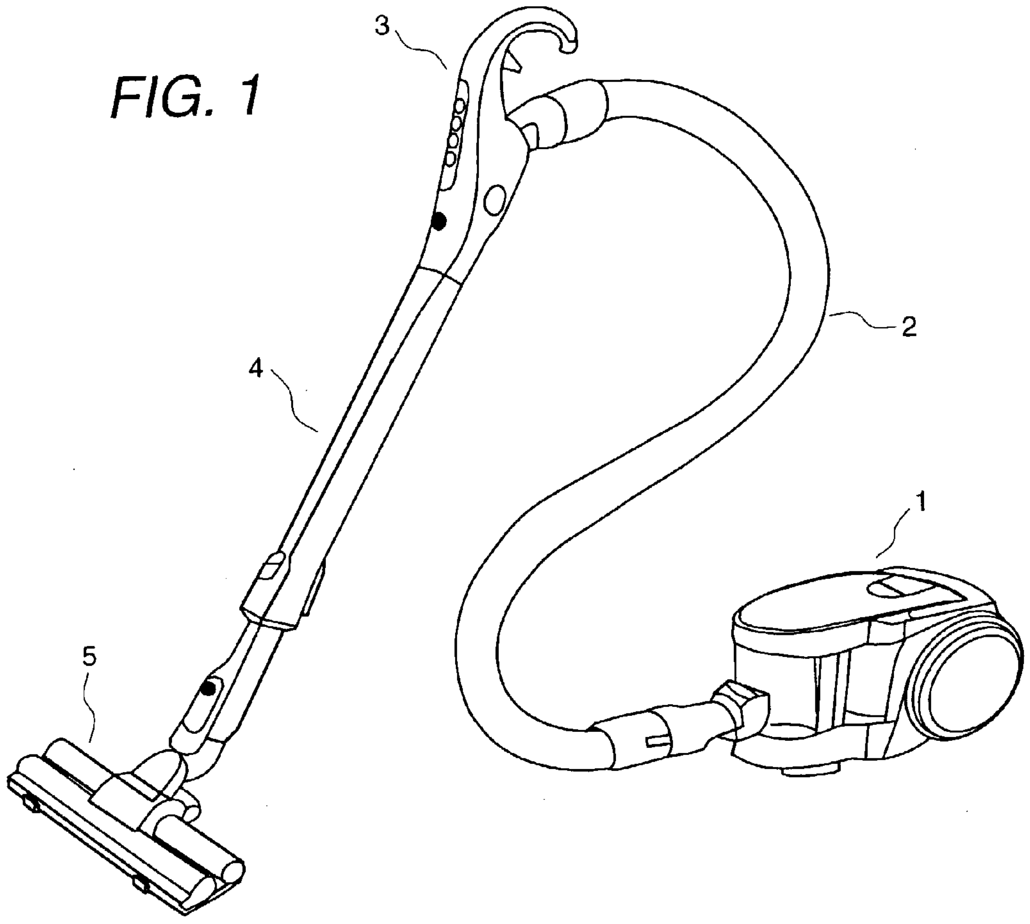
FIG. 1 is an oblique perspective view of the appearance of an electric vacuum cleaner set which is an embodiment of the present invention.
Figure 2:
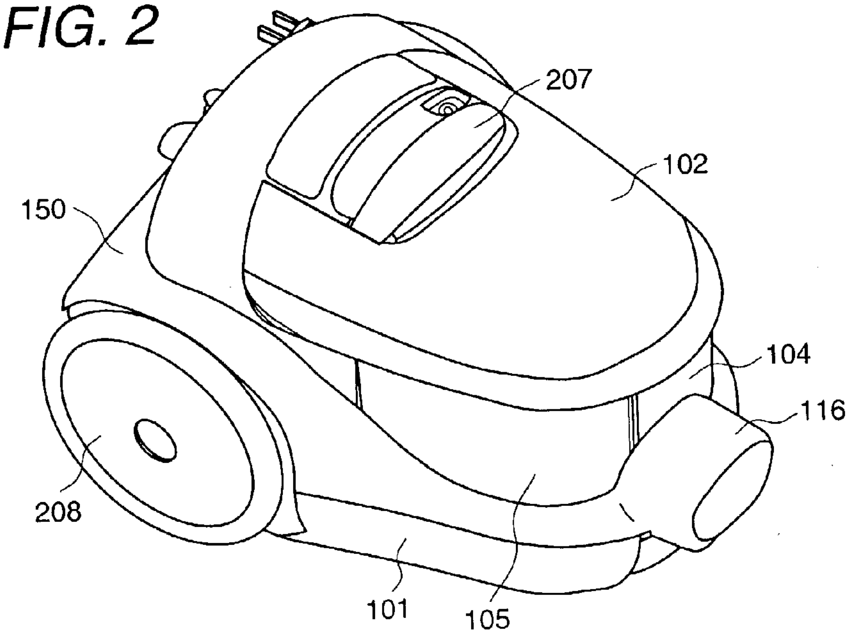
FIG. 2 is an oblique perspective view of the main body of the electric vacuum cleaner of FIG. 1.
Figure 3:
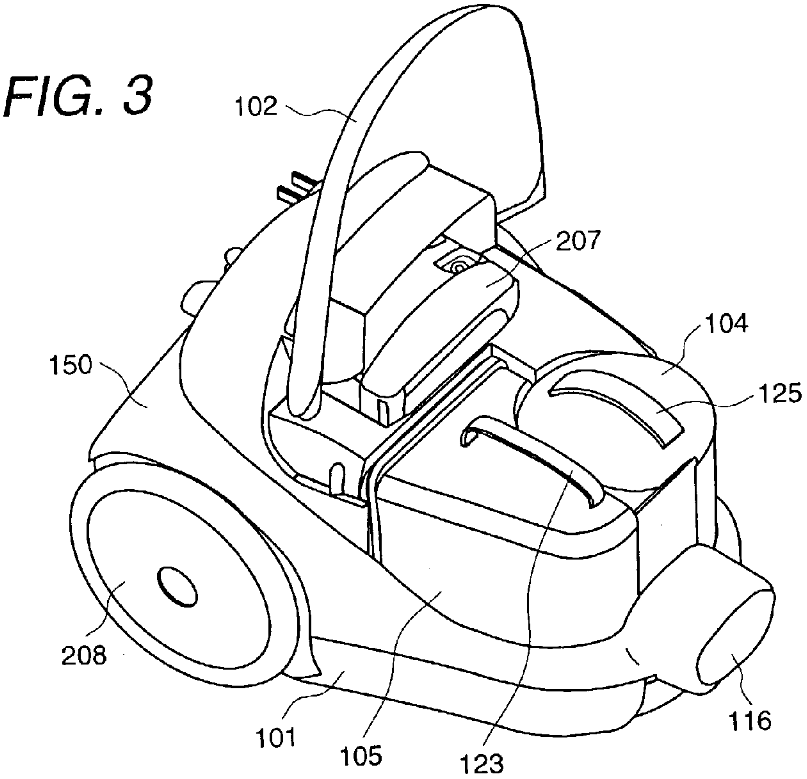
FIG. 3 is an oblique perspective view of the main body of the electric vacuum cleaner of FIG. 1 with the upper cover open.
Figure 4:
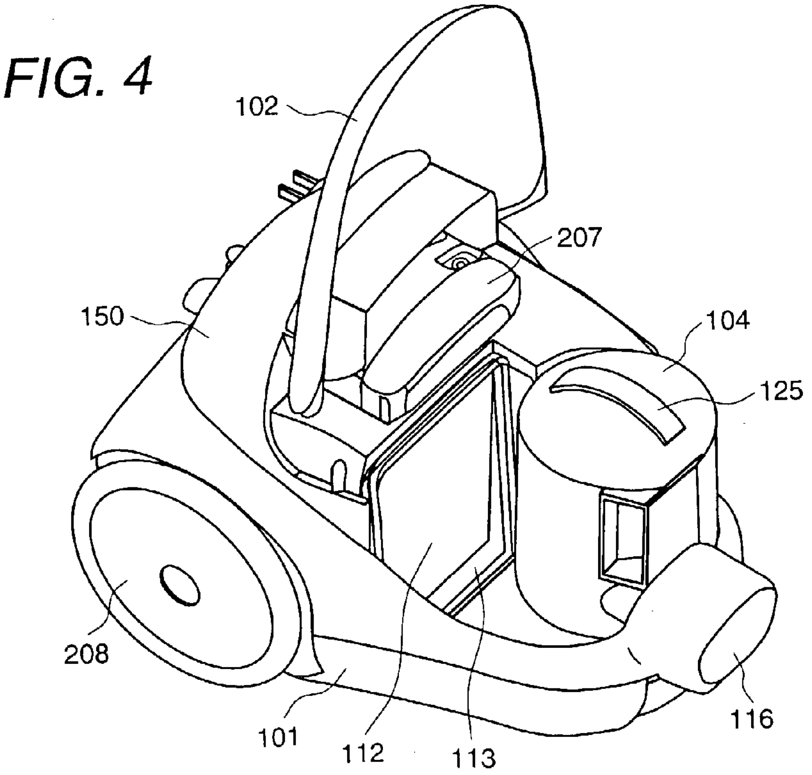
FIG. 4 is an oblique perspective view of the main body of the electric vacuum cleaner of FIG. 1 with the upper cover open and without the dust collecting case.
Figure 5:
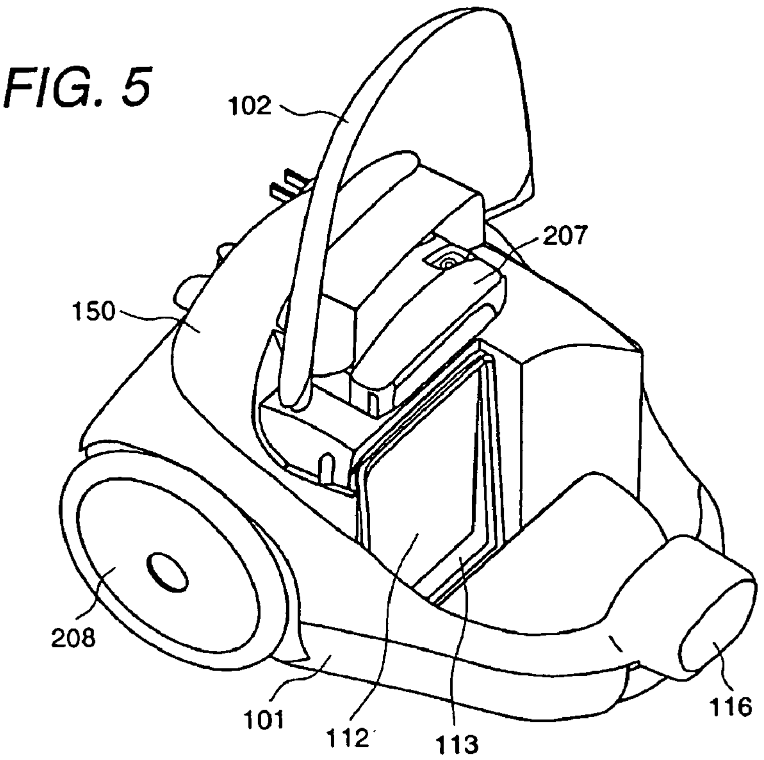
FIG. 5 is an oblique perspective view of the main body of the electric vacuum cleaner of FIG. 1 with the upper cover open and without the dust collecting case and the cyclonic separation cylinder.
Figure 6:
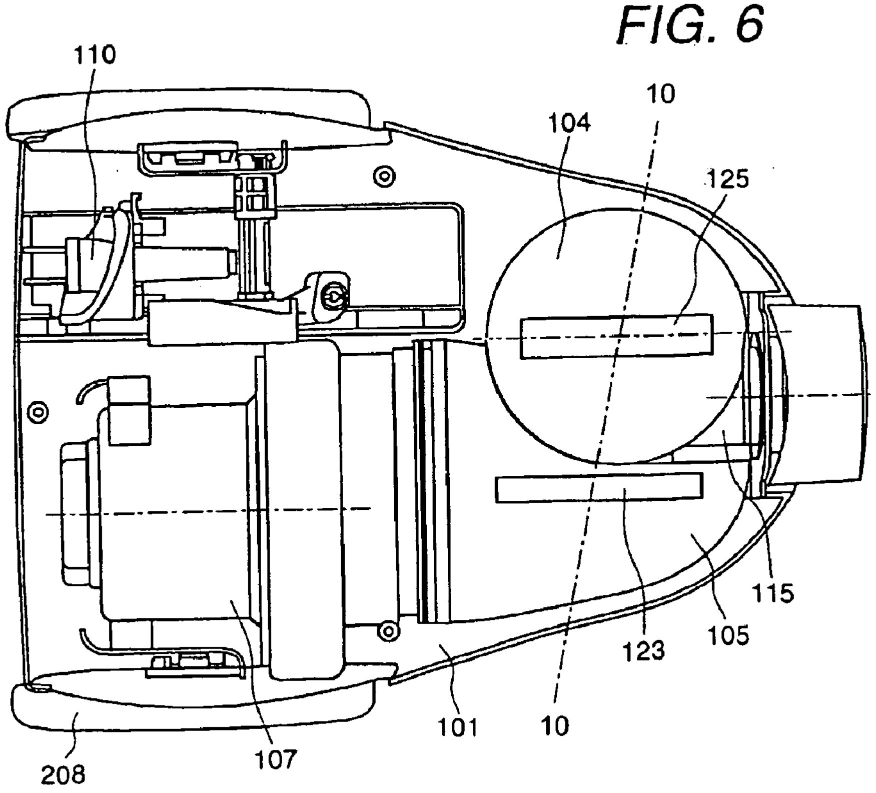
FIG. 6 is a top plan view of the main body of the electric vacuum cleaner without the upper casing and the upper cover.
Figure 7A:
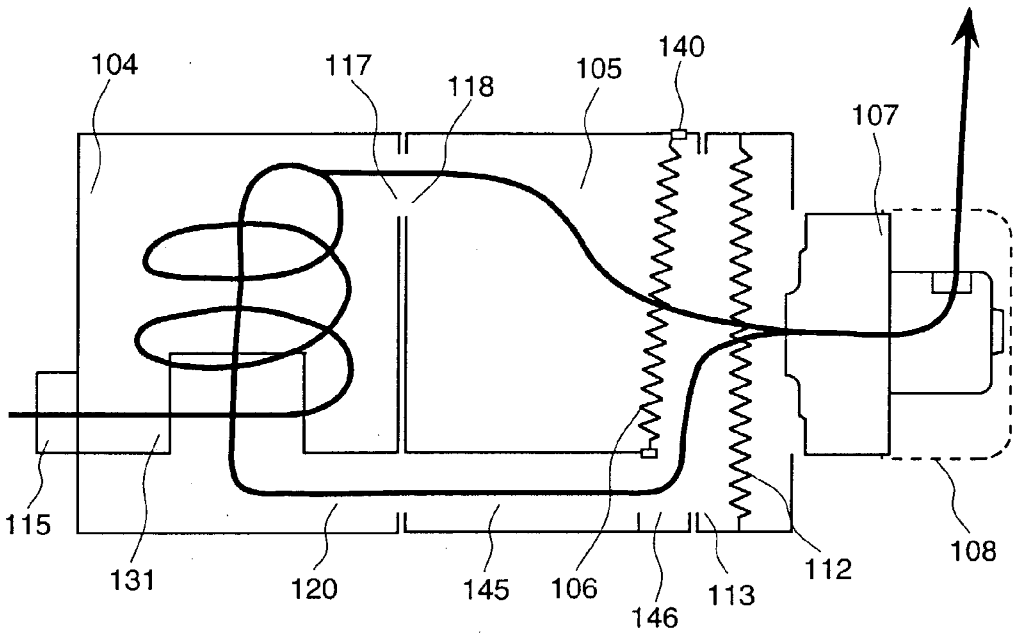
FIG. 7 is airflow diagrams of the electric vacuum cleaner.
Figure 7B:
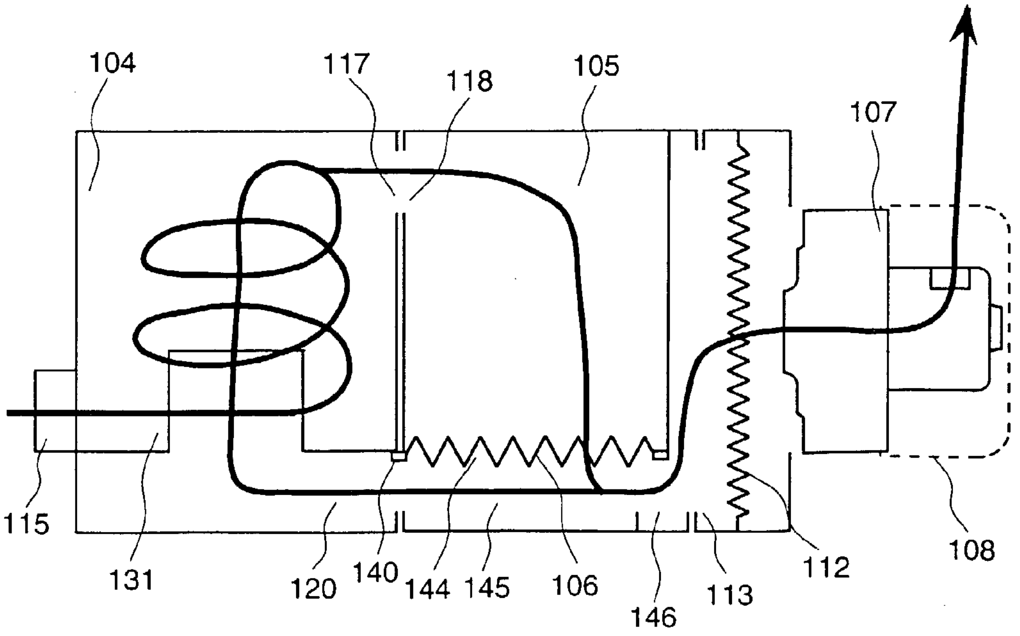

Preferred embodiments of the present invention are described below with reference to the accompanying drawings. FIG. 1 is an oblique perspective view of the appearance of an electric vacuum cleaner set which is an embodiment of the present invention. FIG. 2 is an oblique perspective view of the main body of the electric vacuum cleaner of FIG. 1. FIG. 3 is an oblique perspective view of the main body of the electric vacuum cleaner of FIG. 1 with the upper cover open. FIG. 4 is an oblique perspective view of the main body of the electric vacuum cleaner of FIG. 1 with the upper cover open and without the dust collecting case. FIG. 5 is an oblique perspective view of the main body of the electric vacuum cleaner of FIG. 1 with the upper cover open and without the dust collecting case and the cyclonic separation cylinder. FIG. 6 is a top plan view of the main body of the electric vacuum cleaner without the upper casing and the upper cover. FIG. 7 is airflow diagrams in the main body of the electric vacuum cleaner.

In this embodiment, the electric vacuum cleaner set comprises cleaner body 1, hose 2, tube 3 with an operation panel, extension tube 4, and cleaner head (or floor nozzle) 5 as shown in FIG. 1. For use, the tube 3 with an operation panel is connected to the cleaner body 1 with the hose 2. The floor nozzle 5 is connected to the tube 3 with the extension tube 4.

Cleaner body 1 takes in dirty air from floor nozzle 5 through extension tube 4, tube 3 with an operation panel, and hose 2 by the suction force of a built-in motor-driven blower (to be explained later), cleans the air in the cyclonic separation type dust collector (to be explained later, and discharges the clean air to the outside of the cleaner.

Referring to FIG. 2 to FIG. 6, cleaner body 1 detachably mounts a cyclonic separation cylinder 104 and dust collecting case 105 between lower casing 101 and upper cover 102 and contains second auxiliary filter 112, motor-driven blower 107, and cord reel assembly 110 between lower casing and upper cover 102.

Referring to FIG. 7(*a*), cleaner body 1 takes dirty air from hose 2 into cyclonic separation cylinder 104 though air inlet port 115, swirls up the air therein to centrifugally separate dust from the air and carry the dust into dust collecting case 105 through communicating port 117 on the upper part of the cyclonic separation cylinder, and sends the clean air from cyclonic separation cylinder 104 to air passage 120 provided under cyclonic separation cylinder 104 through inner cylinder 131. The dirty air carried into the dust collecting case 105 is filtered by first auxiliary filter 106. The filtered air is sucked into motor-driven blower 107 through communicating port 146 (behind first auxiliary filter 106) and second auxiliary filter 112. At the same time, the clean air passing through cyclonic separation cylinder 104 is also sucked into the motor-driven blower. The air blown out from motor-driven blower 107 is filtered by filter 108. One part of the filtered air is discharged to the outside through an air passage (not shown) and the other part of the air is sent to cord reel assembly 110 to cool it before being sent out to the outside.

Lower casing 101 is equipped with a guiding wheel (not shown) and wheels 208 for facilitating movement of the cleaner body 1 across a floor. Lower casing 101 also has cyclonic separation cylinder 104 and dust collecting case 105 that are detachably mounted in parallel. Second auxiliary filter 112 is also mounted in parallel with them on lower casing 101.

Upper cover 102 pivotally mounted on the upper rear part of the upper casing 150 is energized to make air inlet port 115 of cyclonic separation cylinder 104 hermetically contact with hose connection port 116 and communicating port 117 of cyclonic separation cylinder 104 hermetically contact with upper opening 118 of dust collecting case 105 when the upper cover is closed. Upper cover 102 is also energized to make air passage 120 under cyclonic separation cylinder 104 hermetically contact with air passage 145 under dust collecting case 105 and to make a space air tight between air outlet 146 of the cyclonic separator and filter casing 113 of second auxiliary filter 112. The axis of cyclonic separation cylinder 104 is vertical to the lower case but can be slanted.

Dust collecting case 105 provides pull-out handle 123 so that the user may pull out dust collecting case 105 for disposal of accumulated dust. The dust in dust collecting case 105 can be dumped by opening first auxiliary filter 106 in dust collecting case 105. As first auxiliary filter 106 is provided on the bottom of dust collecting case 105, the user can easily dump the accumulated dust without turning user's hand.

When the inside of cyclonic separation cylinder 104 becomes dirty, the user can pull out cyclonic separation cylinder 104 by pull-out handle 125 on the cylinder and clean the inside of the cyclonic separation cylinder 104.

The inner surfaces of cyclonic separation cylinder 104 and dust collecting case 105 are coated with UV curing clear resin to protect the surfaces against damages due to collision and scratches by dust particles that flow into cyclonic separation cylinder 104 and dust collecting case 105 and against contamination. This coat increases the friction resistance and contamination resistance of the surfaces. Therefore, even when outer cylinder 135 of cyclonic separation cylinder 104 and dust collecting case 105 are made of clear plastic materials, the quantity of dust in the cylinder and the case can be easily recognized by eyes.

It is also preferable to mold cyclonic separation cylinder 104 and dust collecting case 105 with antistatic resin materials or to coat surfaces thereof with antistatic materials. This prevents static cling of dust particles to the surfaces of cyclonic separation cylinder 104 and dust collecting case 105 and they need not be cleaned so often.

Referring to FIG. 6, the layout of components of cleaner body 1 will be explained below.

FIG. 6 is a top plan view of the main body of the electric vacuum cleaner without upper casing 150 and the upper cover 102.

Hose connection port 116 is located in the center of the width of cleaner body 1 (when viewed from the top). The center axis of cyclonic separation cylinder 104 is moved a little from the center of the width of cleaner body 1. Further, air inlet port 115 to introduce the dirty air approximately tangentially to cyclonic separation cylinder 104 is arranged in alignment with hose connection port 116.

Dust collecting case 105 is placed opposite to the center axis of cyclonic separation cylinder 104 (in relation to the center of the width of cleaner body 1). Similarly motor-driven blower 107 is placed opposite to the center axis of cyclonic separation cylinder 104 (in relation to the center of the width of cleaner body 1). Second auxiliary filter 112 is provided in front of the motor-driven blower. Cord reel assembly 110 is provided next to motor-driven blower in the side where the center axis of cyclonic separation cylinder 104 exists (in relation to the center of the width of cleaner body 1).

This disposition can make the cleaner body shorter, smaller, and less weighted.

Further, this disposition requires no bending at the air inlet port of cyclonic separation cylinder 104 and can reduce a loss.

Figure 8:
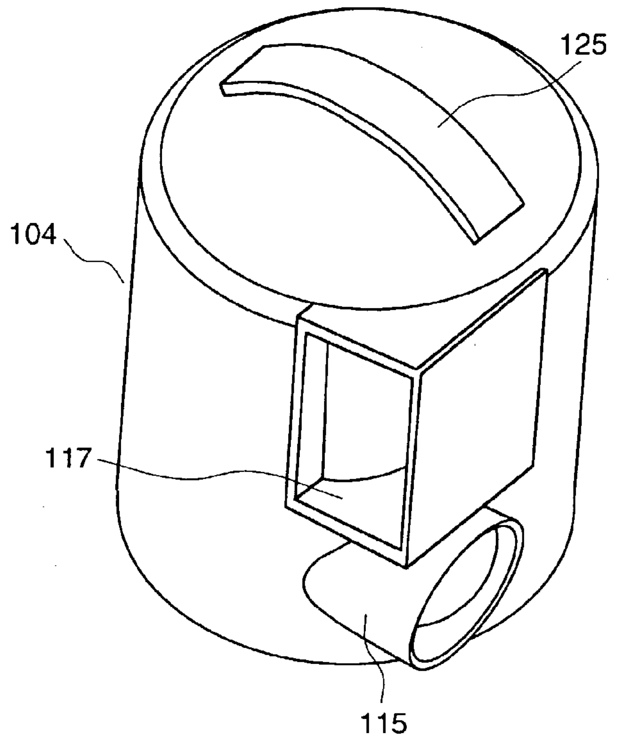
FIG. 8 is an oblique perspective view of the appearance of cyclonic separation cylinder 104.
Figure 9:
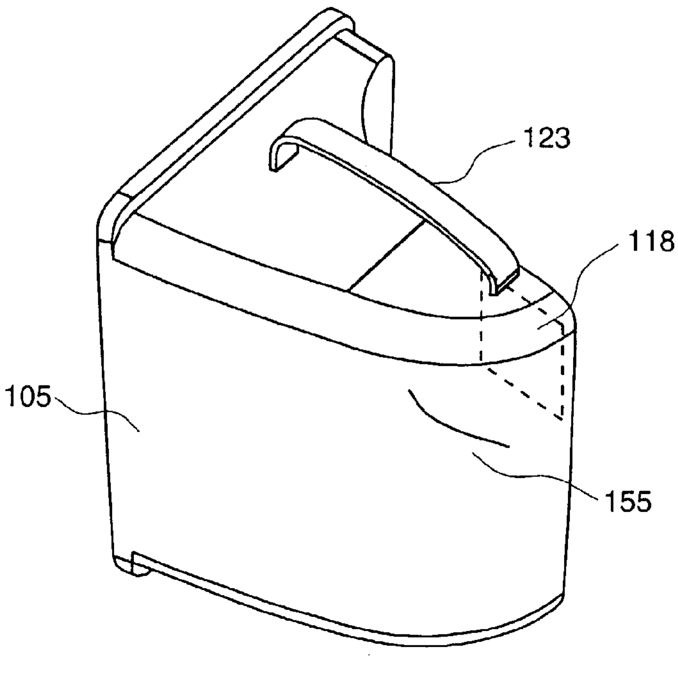
FIG. 9 is an oblique perspective view of the appearance of dust collecting case 105.
Figure 10A:
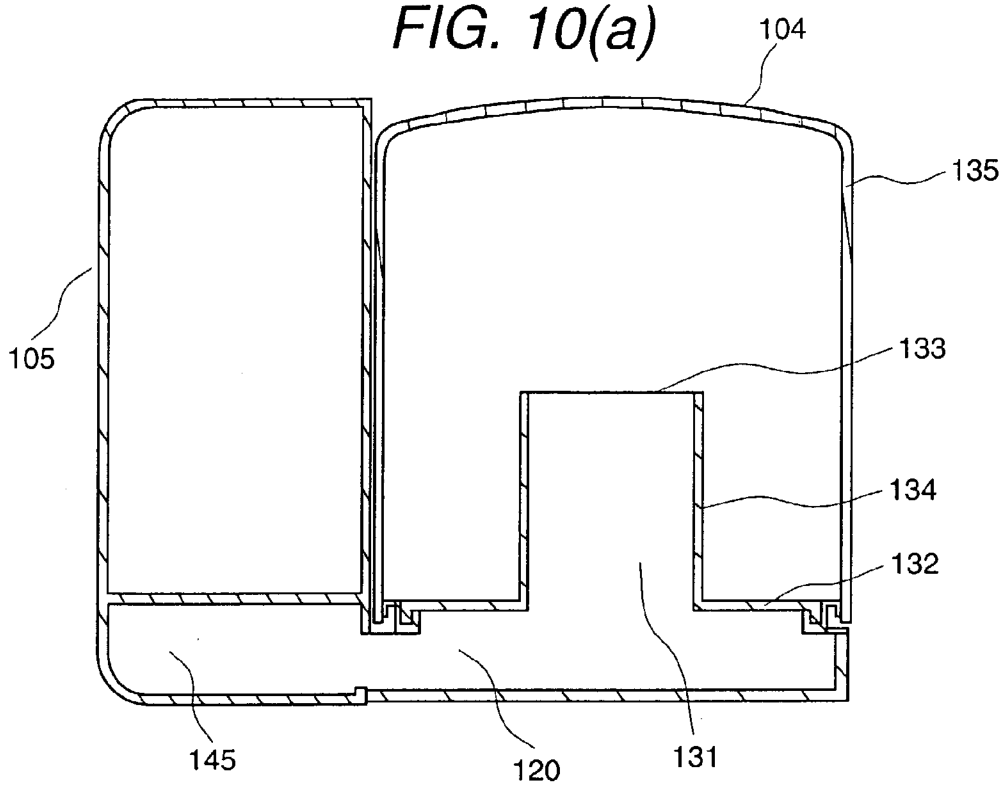
FIG. 10 shows cross-sectional views taken along line 10—10 of FIG. 6.
Figure 10B:
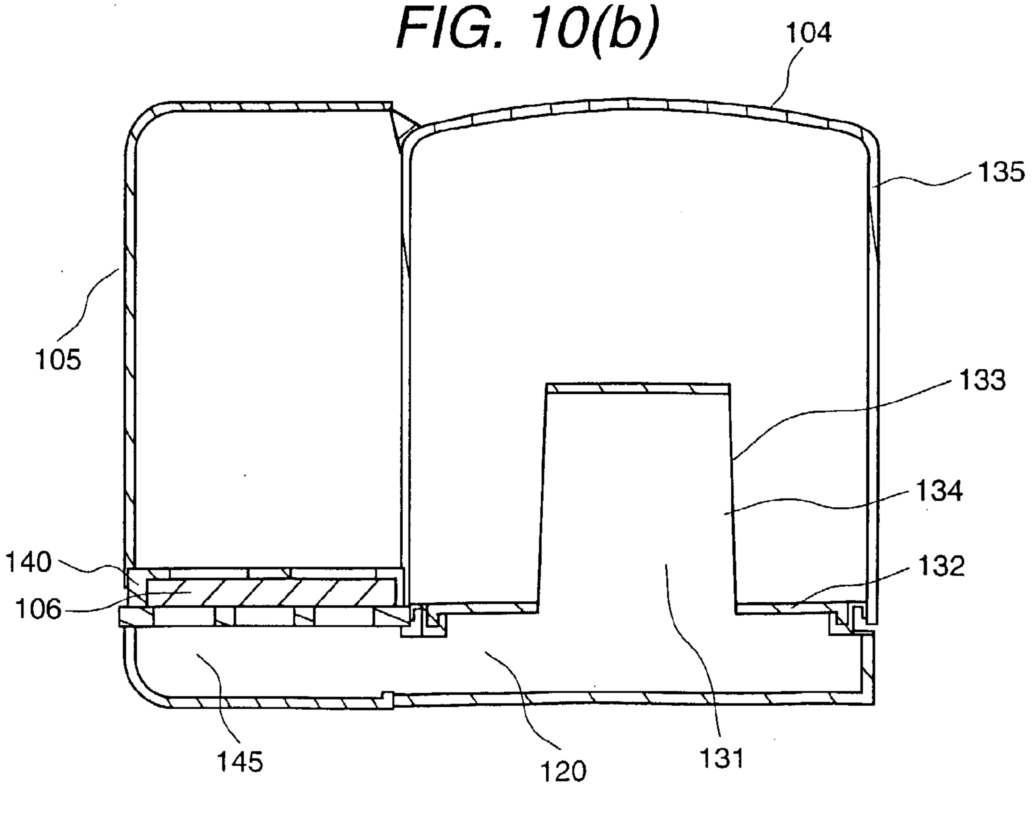
Figure 11A:
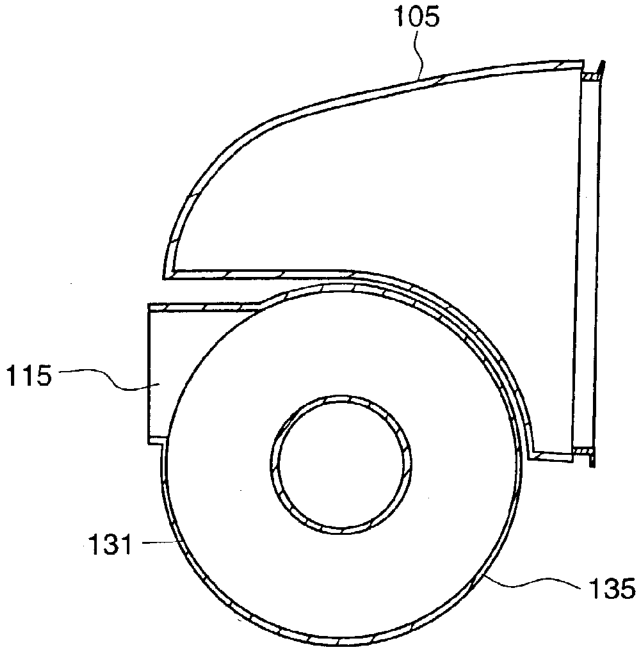
FIG. 11 shows cross-sectional views of cyclonic separation cylinder 104 including the air inlet port.
Figure 11B:
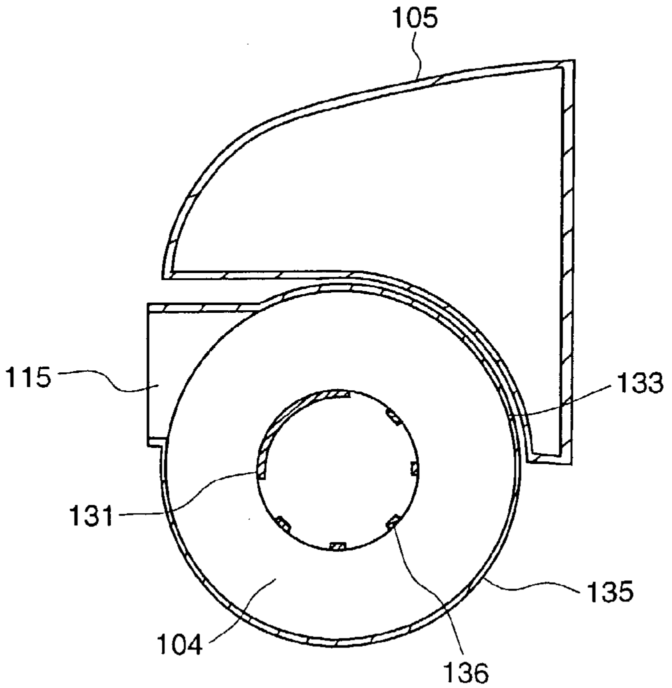
Figure 12A:
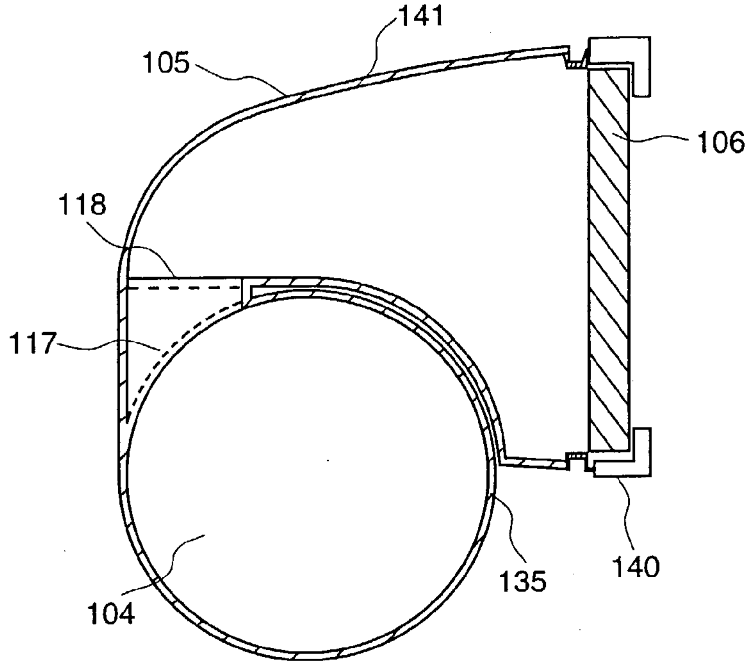
FIG. 12 shows cross-sectional views of cyclonic separation cylinder 104 and dust collecting case 105 including communicating port 117.
Figure 12B:
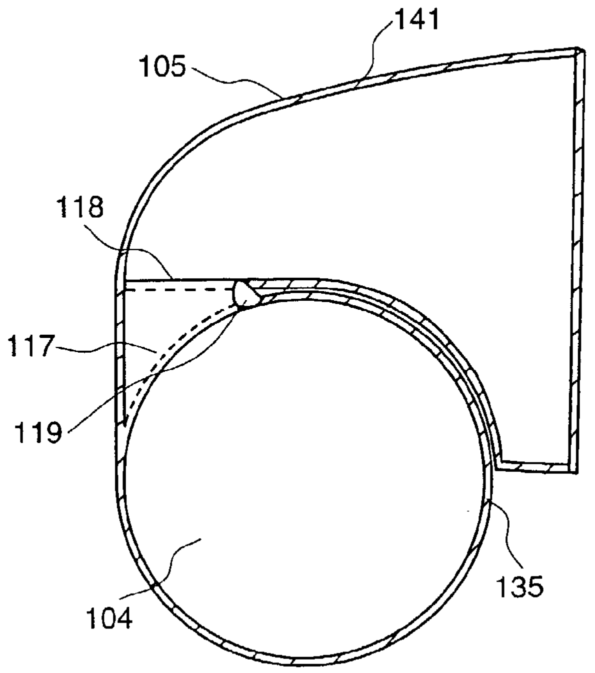
Figure 13A:
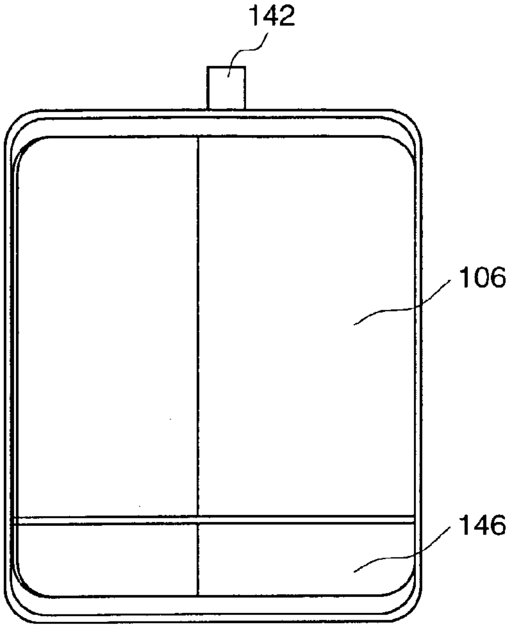
FIG. 13 is a side view of dust collecting case 105 (viewed from the exhaust side).
Figure 13B:
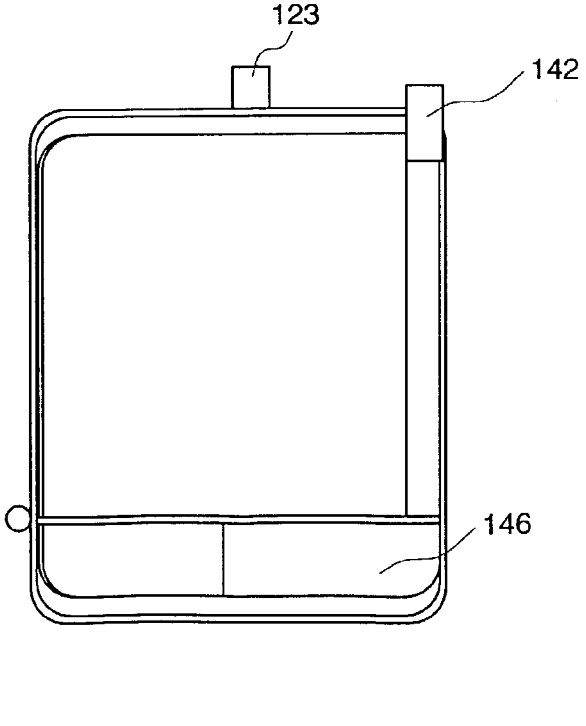

Below will be explained cyclonic separation cylinder 104 and dust collecting case 105 In detail with reference to FIG. 8 to FIG. 13. FIG. 8 Is an oblique perspective view of the appearance of cyclonic separation cylinder 104. FIG. 9 is an oblique perspective view of appearance of dust collecting case 105. FIG. 10(*a*) shows a cross-sectional view taken along line 10—10 of FIG. 6. FIG. 11(*a*) shows a cross-sectional view of cyclonic separation cylinder 104 including the air inlet port. FIG. 12 (*a*) shows a cross-sectional view of cyclonic separation cylinder 104 and dust collecting case 105 including communicating port 117. FIG. 13(*a*) is a side view of dust collecting case 105 (viewed from the exhaust side).

Outer cylinder 135 of cyclonic separation cylinder 104 has air inlet port 115 on the lower part of the cylinder (below the center of the longitudinal center axis of the cylinder) to introduce dirty air approximately tangentially to cyclonic separation cylinder 104 which is approximately cylindrical.

Cyclonic separation cylinder 104 also has communicating port 117 on the upper part of the cylinder to introduce dirty air into dust collecting case 105. Cyclonic separation cylinder 104 has inner cylinder 131 on the bottom of the cyclonic separation cylinder 104 which communicates with lower communicating passage 120. Inner cylinder 131 comprises partition wall 132 and cylindrical member 134 with which net filter 133 made of plastic fiber is formed in a body by insert-mounting. As shown in FIG. 10(*a*), net filter 133 can be formed singly on the top of the cylindrical member or together with the side of the cylindrical member. When net filter 133 is treated with antistatic agent, dust on net filter 133 can be easily knocked off.

Cyclonic separation cylinder 104 comprises outer cylinder 135, inner cylinder 131, and a member that forms air passage 120. These components are respectively detachable and combined together to prevent air and dirt leaking there from. It is preferable to place a sealing member between the components that are combined. For cleaning of cyclonic separation cylinder 104, outer cylinder 135, inner cylinder 131, and a member that forms air passage 120 are separated individually.

Dust collecting case 105 has upper opening 118 in alignment with communicating port 117 of cyclonic separation cylinder 104. Upper opening 118 and communicating port 117 are linked in an air-tight manner. Dust collecting case 105 also has filter frame 140 with first auxiliary filter 106 on the exhaust side of the case. The frame has its sides open and can rotate around the lower side of the frame. When closed, filter frame 140 is hermetically in close contact with case 141 of dust collecting case 105.

For dust disposal, the user takes out dust collecting case 105 by pull-out handle 123 thereof, pulls lever 142 of a clamp means that locks filter frame 140 to open the frame, and dumps dust collecting case 105. The user can take out first auxiliary filter 106 from filter frame 140 to wash thereof.

Auxiliary filter 106 is preferably made of foamed washable plastic material such as sponge or washable nonwoven cloth.

When first auxiliary filter 106 and second auxiliary filter 112 are treated with antistatic agent, dust on the filters can be easily knocked off.

Dust collecting case 105 has a combination of air passage 145 and communicating port 146 thereunder. Therefore, dust collecting case 105 comprises case 141, air passage 145, and communicating port 146 under filter frame 140. They are linked hermetically in close contact with each other.

Filter frame 140 is also hermetically in close contact with filter casing 113 that holds second auxiliary filter 112 in front of motor-driven blower 107. To assure their airtightness, an elastic sealing member is preferably placed between the filter frame and the filter case.

When motor-driven blower 107 is turned on, cleaner body 1 of the above configuration takes in dirty air from air inlet port 115 of cyclonic separation cylinder 104 into the cylinder by the suction force, swirls up the dirty air to separate dust centrifugally and deliver the separated dust into dust collecting case 105, and sucks the clean air from inner cylinder 131 of cyclonic separation cylinder 104 into air message 120 through net filter 133. This net filter functions to capture lint.

The air from air passage 120 is sent to second auxiliary filter 112 through air passage 145 and communicating port 146.

The dirty air coming from cyclonic separation cylinder 104 flows into dust collecting case 105 through upper opening 118 that communicates with communicating port 117. The dust in the air is stopped by first auxiliary filter 106 and accumulates before the filter. The air passing through the auxiliary filter flows toward the second auxiliary filter.

The dust capturing performance of first auxiliary filter 106 is dependent upon the characteristics of the filter material and is expected to catch dust particles of some microns big. If the dust capturing performance is increased, the filter may be blocked quickly. Therefore, the dust capturing performance must be determined considering the whole dust capturing performance of the electric vacuum cleaner.

As almost all dust brought into cleaner body 1 together with air is accumulated in dust collecting case 105, only dust collecting case 105 can be taken out from cleaner body 1 to dump it. It is preferable to perform this dumping before dust overflows dust collecting case 105. To know the timing to dump dust collecting case 105, dust indicator 155 is provided on dust collecting case 105 opposite to upper opening 118 as shown in FIG. 9. The user can judge the dumping timing by this indicator. The dust indicator is neither vertical nor horizontal, but it is slanted as the dust accumulates thinner near upper opening 118.

Referring to FIG. 7(*a*), this embodiment divides the airflow into two in cleaner body 1. These air flows cause a pressure difference in dust collecting case 105 and this pressure difference always presses the dust in dust collecting case 105. This pressure difference becomes greater as more dust accumulates in dust collecting case 105. Further the dust is compressed more strongly as the dust becomes more. This mechanism allows more dust to be accumulated in dust collecting case 105 and consequently reduces a dust dumping frequency.

Further, as this mechanism makes the air flow going out of cyclonic separation cylinder 104 less than the air flow when no air flows into dust collecting case 105, the resistance of cyclonic separation cylinder 104 can be reduced and the vacuum cleaner can have a greater suction power.

As more dust accumulates in dust collecting case 105, the resistance of air passing through dust collecting case 105 increases and the flow rate of air in the case reduces. This has an effect to reduce bad smells from the dust when the dust contains materials that give out bad smells. Therefore, less bad smells are exhausted out of the cleaner body.

It is also possible to easily clean air passage 145 and communicating port 146 (when they are dirty) with dust collecting case 105 removed.

Further, as cyclonic separation cylinder 104 has air inlet port 115 and inner cylinder 131 on the lower part thereof, the communicating port can be provided on the upper part. This prevents dust from leaking from cyclonic separation cylinder 104.

Further as dust collecting case 105 is provided by cyclonic separation cylinder 104, the longitudinal length of cyclonic separation cylinder 104 can be made greater without increasing the height of cleaner body 1. This feature can increase the capacity of separating dust by swirling.

Further, heavy dust particles such as rings that are not affected by a fluid force are apt to stay in cyclonic separation cylinder 104. The user can easily take out such dust particles from air inlet port 115 just by taking up cyclonic separation cylinder 104 by pull-out handle 125 and tilting the cylinder.

Figure 14:
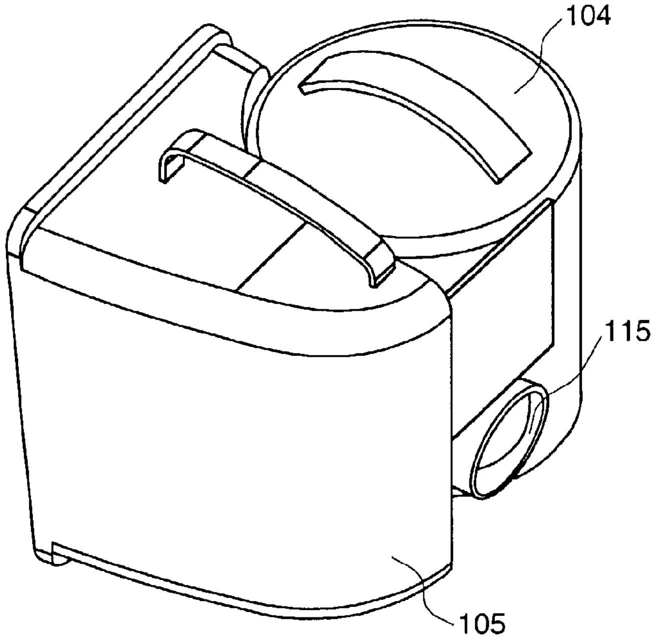
FIG. 14 is an oblique perspective drawing of a combination of cyclonic separation cylinder 104 and dust collecting case 105.

As shown in FIG. 14, cyclonic separation cylinder 104 and dust collecting case 105 can be formed in a body. This unit is heavy and not so convenient in handling, but the connection between cyclonic separation cylinder 104 and dust collecting case 105 and the connection between air passage 120 and air passage 145 are formed in a body and made air-tight perfectly. This can suppress pressure loss due to leakage and increase the suction power.

It is also possible to form air passage 120, air passage 145, and communicating port 146 with a member of another material in close contact with lower casing 101. This mechanism does not facilitate cleaning of air passage 145 when it becomes dirty, but can reduce the number of places to be hermetically sealed. Further, this mechanism also facilitates sealing in a vertical direction only.

Embodiment 2

A second preferred embodiment of the present invention is described below with reference to FIG. 7(*b*), FIG. 8, FIG. 9, FIG. 10(*b*), FIG. 11(*b*), FIG. 12(*b*), FIG. 13(*b*), FIG. 15, and FIG. 16.

Referring to FIG. 7(*b*), cleaner body 1 takes dirty air from hose 2 into cyclonic separation cylinder 104 though air inlet port 115, swirls up the air therein to centrifugally separate dust from the air and carry the dust into dust collecting case 105 through communicating port 117 on the upper part of the cyclonic separation cylinder, and sends the clean air from cyclonic separation cylinder 104 to air passage 120 provided under cyclonic separation cylinder 104 through inner cylinder 131. The dirty air carried into the dust collecting case 105 is filtered by first auxiliary filter 106.

The filtered air is sucked into motor-driven blower 107 through err outlet 146 of the cyclonic separator (behind first auxiliary filter 106) and second auxiliary filter 112. At the same time, the clean air passing through cyclonic separation cylinder 104 is also sucked into the motor-driven blower through the air outlet 120, and air passage 145 together with the clean air from dust collecting case 105. The air blown out from motor-driven blower 107 is filtered by filter 108. One part of the filtered air is discharged to the outside through an air passage (not shown) and the other part of the air is sent to cord reel assembly 110 to cool it before being sent out to the outside. FIG. 8 is an oblique perspective view of the appearance of cyclonic separation cylinder 104. Fig 9 is an oblique perspective view of the appearance of dust collecting case 105. FIG. 10(*b*) shows a cross-sectional view taken along line 10—10 of FIG. 6. FIG. 11(*b*) shows a cross-sectional view of cyclonic separation cylinder 104 including the air inlet port. FIG. 12(*b*) shows a cross-sectional view of cyclonic separation cylinder 104 and dust collecting case 105 including communicating port 117. FIG. 13(*b*) is a side view of dust collecting case 105 (viewed from the exhaust side). Outer cylinder 135 of cyclonic separation cylinder 104 has air inlet port 115 on the lower part of the cylinder (below the center of the longitudinal center axis of the cylinder) to introduce dirty air approximately tangentially to cyclonic separation cylinder 104 which is approximately cylindrical.

Cyclonic separation cylinder 104 also has communicating port 117 on the upper part of the cylinder to introduce dirty air into dust collecting case 105. Cyclonic separation cylinder 104 has inner cylinder 131 on the bottom of the cyclonic separation cylinder 104 which communicates with lower communicating passage 120. Inner cylinder 131 comprises partition wall 132 and cylindrical member 134 with which net filter 133 made of plastic fiber is formed in a body by insert-mounting. As shown in FIG. 10(*b*), net filter 133 can be formed on the wall of the cylindrical member or on both of the top and the cylindrical member.

In this embodiment, the net filter 133 is not formed on the whole periphery of the wall of inner cylinder 131. Net filter 133 and the opening are not provided in a 90-degree area of the inner cylinder near air inlet port 115. This prevents long dust particles such as hairs (sent from air inlet port 115) from directly hitting net filter 133, sticking into the net filter or being twined around with the net filter.

Similarly, this prevents sharp-pointed materials such as pins and needles (sent from air inlet port 115) from directly hitting net filter 133, breaking the net filter, and leaking.

Further, inner cylinder 131 requires a plurality of ribs 136 on the inner side of the cylinder to support the net filter because the net filter receives a centripetal force.

When net filter 133 is treated with antistatic agent, dust on the net filter can be easily knocked off and cleaned.

Outer cylinder 135 of cyclonic separation cylinder 104 has air inlet port 115 on the lower part of the cylinder (below the center of the longitudinal center axis of the cylinder) to introduce dirty air. Therefore, hose connection port 116 communicating with air inlet port 115 can also be placed on the lower part of cyclonic separation cylinder 104 (below the center of the longitudinal center axis of the cylinder).

As hose connection port 116 is provided on the lower part of cleaner body 1, the cleaner body can be pulled around steadily by moving the tube with the operation panel 3 that is connected to the cleaner body with hose 2.

Further, hose connection port 116 can be provided on the lower part of cleaner body 1 and need not be provided on upper cover 102. Therefore, it is possible to open the upper cover and take out dust collecting case 105 and cyclonic separation cylinder 104 easily without disconnecting the hose.

Cyclonic separation cylinder 104 comprises outer cylinder 135, inner cylinder 131, and a member that forms air passage 120. These components are respectively detachable and combined together to prevent air and dirt leaking therefrom. It is preferable to place a sealing member between the components that are combined. For cleaning of cyclonic separation cylinder 104, outer cylinder 135, inner cylinder 131, and a member that forms air passage 120 are separated individually.

Dust collecting case 105 has upper opening 118 in alignment with communicating port 117 of cyclonic separation cylinder 104. Upper opening 118 and communicating port 117 are linked in an air-tight manner. Dust collecting case 105 also has filter frame 140 with first auxiliary filter 106 on the exhaust side of the case.

The frame has its sides open and can rotate around the lower side of the frame. When closed, filter frame 140 is hermetically in close contact with case 141 of dust collecting case 105. For dust disposal, the user takes out dust collecting case 105 by pull-out handle 123 thereof, pushes lever 142 of a clamp means that locks filter frame 140 to open the frame, and dumps dust collecting case 105. As dust collecting case 105 is wider towards the bottom, it is very easy to empty dust collecting case 105 completely.

The user can take out first auxiliary filter 106 from filter frame 140 to wash thereof.

Auxiliary filter 106 is preferably made of foamed washable plastic material such as sponge or washable nonwoven cloth.

When first auxiliary filter 106 and second auxiliary filter 112 are treated with antistatic agent, dust on the filters can be easily knocked off.

Dust collecting case 105 has a combination of air passage 145 and air outlet 146 of the cyclonic separator thereunder. Therefore, dust collecting case 105 comprises case 141, air passage 145, and communicating port 146 under filter frame 140. They are linked hermetically in close contact with each other.

Filter frame 140 is also hermetically in close contact with filter casing 113 that holds second auxiliary filter 112 in front of motor-driven blower 107. To assure their airtightness, an elastic sealing member is preferably placed between the filter frame and the filter case.

When motor-driven blower 107 is turned on, cleaner body 1 of the above configuration takes in dirty air from air inlet port 115 of cyclonic separation cylinder 104 into the cylinder by the suction force, swirls up the dirty air to separate dust centrifugally and deliver the separated dust into dust collecting case 105, and sucks the clean air from inner cylinder 131 of cyclonic separation cylinder 104 into air passage 120 through net filter 133.

This net filter functions to capture lint, paper dust, and so on.

The air from air passage 120 is sent to second auxiliary filter 112 through air passage 145 and communicating port 146.

The dirty air coming from cyclonic separation cylinder 104 flows into dust collecting case 105 through upper opening 118 that communicates with communicating port 117. The dust in the air is stopped by first auxiliary filter 106 and accumulates before the filter. The air passing through the auxiliary filter flows toward the second auxiliary filter.

The dust capturing performance of first auxiliary filter 106 is dependent upon the characteristics of the filter material and is expected to catch dust particles of some microns big. If the dust capturing performance is increased, the filter may be blocked quickly. Therefore, the dust capturing performance must be determined considering the whole dust capturing performance of the electric vacuum cleaner.

As almost all dust brought into cleaner body 1 together with air is accumulated in dust collecting case 105, only dust collecting case 105 can be taken out from cleaner body 1 to dump it. It is preferable to perform this dumping before dust overflows dust collecting case 105. To know the timing to dump dust collecting case 105, dust indicator 155 is provided on dust collecting case 105 opposite to upper opening 118 as shown in FIG. 9. The user can judge the dumping timing by this indicator. The dust indicator is neither vertical nor horizontal, but it is slanted as the dust accumulates thinner near upper opening 118.

Referring to FIG. 7(*b*), this embodiment divides the airflow into two in cleaner body 1. These air flows cause a pressure difference in dust collecting case 105 and this pressure difference always presses the dust in dust collecting case 105. This pressure difference becomes greater as more dust accumulates in dust collecting case 105. Further the dust is compressed more strongly as the dust becomes more.

As first auxiliary filter 106 is provided on the lower part of dust collecting case 105, the dust in dust collecting case 105 is compressed by its weight. This mechanism allows more dust to be accumulated in dust collecting case 105 and consequently reduces a dust dumping frequency.

The dust in dust collecting case 105 accumulates in layers in front of first auxiliary filter 106, catching up fine dust in the layers. This has an effect of preventing fine dust from rising up when the accumulated dust is disposed of.

Further, as this mechanism makes the air flow going out of cyclonic separation cylinder 104 through air outlet 120 less than the air flow when no air flows into dust collecting case 105, the resistance of cyclonic separation cylinder 104 can be reduced and the vacuum cleaner can have a greater suction power.

Dirty air introduced into cyclonic separation cylinder 104 though air inlet port 115 is forced to swirl therein. Dust particles in the dirty air are centrifugally separated from the air, lifted up in cyclonic separation cylinder 104, and delivered into dust collecting case 105.

Because of the air flow passing through first auxiliary filter 106 of dust collecting case 105 from cyclonic separation cylinder 104, dust that is centrifugally separated in cyclonic separation cylinder 104 is apt to go into dust collecting case 105 and immediately separated in dust collecting case 105. This increases the dust collection efficiency.

The dust that is centrifugally separated in cyclonic separation cylinder 104 and delivered to dust collecting case 105 will not go back to cyclonic separation cylinder 104. This prevents re-flow of dust from dust collecting case 105 and increase the dust collection efficiency.

As dust is captured by net filter 133 of inner cylinder 131, the flow rate of clean air from air outlet 120 of cyclonic separation cylinder 104 reduces. This increases the flow rate of air that is filtered by first auxiliary filter 106 from air outlet 144 of dust collecting case 105. Therefore, the dust on the net filter in dust collecting case 105 is apt to be delivered to dust collecting case 105.

In this embodiment, the cross-section of air outlet 144 that flows air from first auxiliary filter 106 of dust collecting case 105 is made greater than the cross-section of air outlet 120 that flows the clean are from cyclonic separation cylinder 105. This makes the cross-section of the first auxiliary filter and reduce the flow rate of air passing through the first auxiliary filter. This can reduce the quantity of dust that passes through the first auxiliary filter. Further, this can reduce the pressure loss of air that flows through first auxiliary filter 106 and consequently increases the suction power of the vacuum cleaner.

Here, it is possible to prevent dust from being caught by downstream end 119 of communicating port 117 of cyclonic separation cylinder 104 by curving the downstream end or applying a smooth slippery material (of a low friction coefficient) to the downstream end. When the upper side of downstream end 119 is tilted towards first air outlet 144 that is the outlet of air from dust collecting case 105 (or when the upper part of the opening of communicating port 117 is made wider), it is possible that dust particles caught at downstream end 119 of communicating port 117 are moved up in the communicating port and ripped away by the air flowing from cyclonic separation cylinder 104 to dust collecting case 105.

As more dust accumulates in dust collecting case 105, the resistance of air passing through dust collecting case 105 increases and the flow rate of air in the case reduces. This has an effect to reduce bad smells from the dust when the dust contains materials that give out bad smells. Therefore, less bad smells are exhausted out of the cleaner body.

Air passage 145 and cyclonic separator air outlet 146 (when dirty) can be cleaned with dust collecting case 105 removed.

Further, as air inlet port 115 and inner cylinder 131 are provided on the lower part of cyclonic separation cylinder 104, communicating port 117 of cyclonic separation cylinder 104 and upper opening 118 of dust collecting case 105 can be provided on the upper part thereof. Dust coming into dust collecting case 105 goes down by gravity and will not go back to cyclonic separation cylinder 104.

Further, upper opening 118 of dust collecting case 105 is provided on the upstream side of dust collecting case 105. When cleaner body 1 stands upright for storage, upper opening 118 of dust collecting case 105 comes over dust collecting case 105. Therefore, dust in dust collecting case 105 will never fall back into cyclonic separation cylinder 104.

Further as dust collecting case 105 is provided by cyclonic separation cylinder 104, the longitudinal length of cyclonic separation cylinder 104 can be made greater without increasing the height of cleaner body 1. This feature can increase the capacity of separating dust by swirling.

A valve can be provided near air inlet port 115 to close the air inlet port when motor-driven blower 107 stops and to close a space between inner cylinder 131 and part of the inner wall of outer cylinder 135 in cyclonic separation cylinder 104.

Heavy dust particles such as rings that are not affected by a fluid force will come into collision with the valve and stop swirling. This protects the inner wall of outer cylinder 185 against damages by collision of dust particles. This valve can prevent leaking of dust when motor-driven blower 107 is turned off and cyclonic separation cylinder 104 is taken out from the cleaner body.

As heavy dust particles such as rings that are not affected by a fluid force will not be carried into dust collecting case 105 from cyclonic separation cylinder 104, first auxiliary filter 106 of dust collecting case 105 cannot be broken and will not let any dust pass through.

As shown in FIG. 14, cyclonic separation cylinder 104 and dust collecting case 105 can be formed in a body. This unit is heavy and not so convenient in handling, but the connection between cyclonic separation cylinder 104 and dust collecting case 105 and the connection between air passage 120 and air passage 145 are formed in a body and made air-tight perfectly. This can suppress pressure loss due to leakage, increase the suction power, and suppress leaking of dust.

It is also possible to form air passage 120, air passage 145, and communicating port 146 with a member of another material in close contact with lower casing 101. This mechanism does not facilitate cleaning of air passage 145 when it becomes dirty, but can reduce the number of places to be hermetically sealed. Further, this mechanism also facilitates sealing in a vertical direction only and increase the suction power.

Embodiment 3

A third preferred embodiment of the present invention is described below with reference to FIG. 15 to FIG. 18. FIG. 15 is an oblique perspective view of the appearance of an upright electric vacuum cleaner set which is an embodiment of the present invention.

Figure 15:
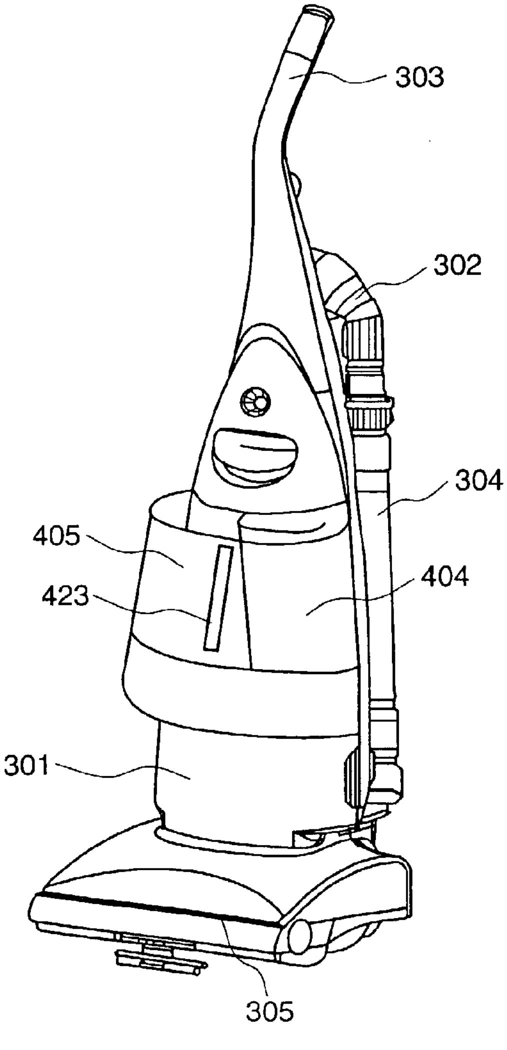
FIG. 15 is an oblique perspective view of the appearance of an upright electric vacuum cleaner set which is an embodiment of the present invention.
Figure 16:
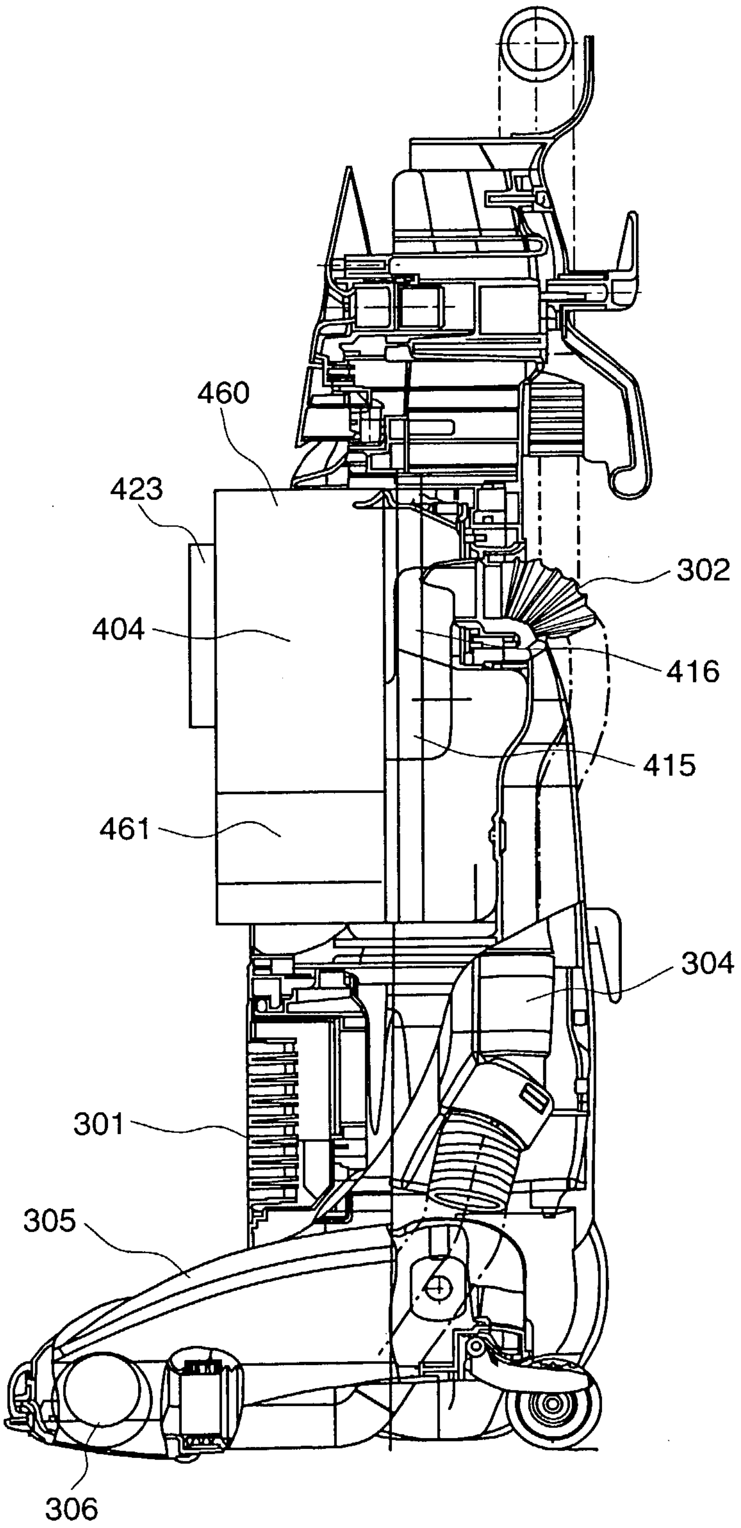
FIG. 16 is a side view of the upright electric vacuum cleaner set of FIG. 15.
Figure 17:
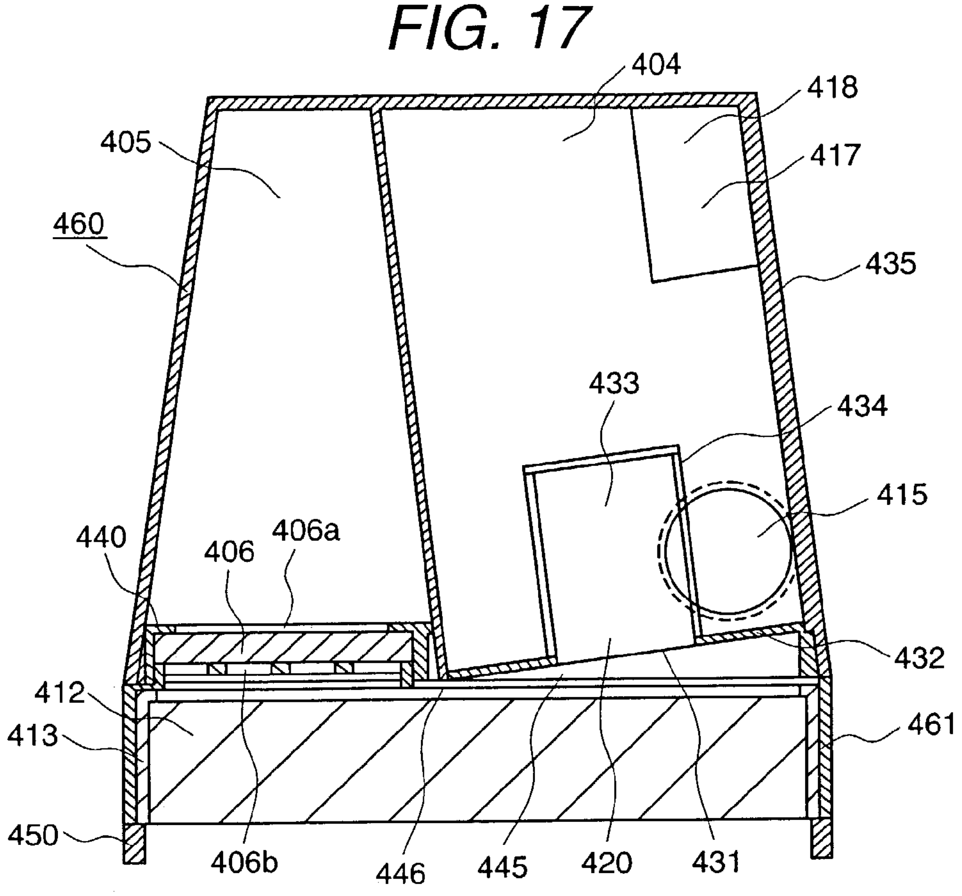
FIG. 17 is a vertical cross-sectional view of a combination of cyclonic separation cylinder 404 and dust collecting case 405.
Figure 18:
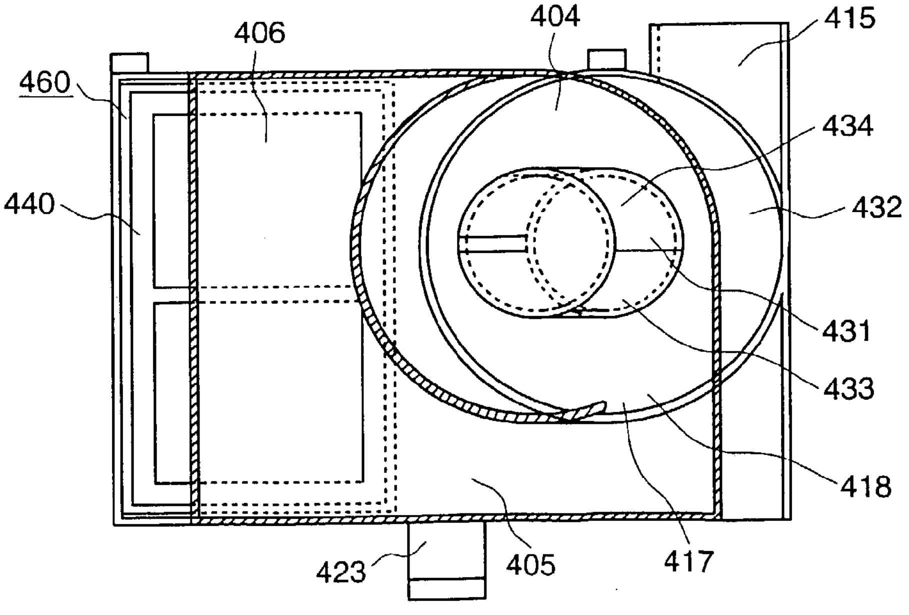
FIG. 18 shows a cross-sectional view of cyclonic separation cylinder 404 and dust collecting case 405 including communicating port 417.

FIG. 16 is a side view of the upright electric vacuum cleaner set of FIG. 15. This is a partial sectional view of the vacuum cleaner to explain airflow thereof. FIG. 17 is a vertical cross-sectional view of a combination of cyclonic separation cylinder 404 and dust collecting case 405. FIG.

18 shows a cross-sectional view of cyclonic separation cylinder 404 and dust collecting case 405 including communicating port 417.

Vacuum cleaner 301 has a floor cleaning head 305 which is open to the floor and rotatable in a predetermined angle range. The floor cleaning head contains a floor-contacting rotating brush member 306. Vacuum cleaner 301 detachably contains dust collector 460 which rotatably comprises cyclonic separation cylinder 404, dust collecting case 405, and dust collector lid 461 thereunder. Motor-driven blower is located above floor cleaning head 305 and below dust collector 460 (under cleaner body 301) to drive brush member 306 in floor cleaning head 305 and the blower by the rotation of the rotary shaft of the motor-driven blower. The suction force of the motor-driven blower introduces dirty air from floor cleaning head 305, carries it to dust collecting case 405 by cyclonic separation cylinder 404 through joint tube 304 and hose 302. Handle 303 is provided on cleaner body 301 to move the electric vacuum cleaner across the floor.

Cleaner body 301 takes dirty air from hose 302 into cyclonic separation cylinder 404 though air inlet port 415, swirls up the air therein to centrifugally separate dust from the air and carry the dust into dust collecting case 405 through communicating port 417 on the upper part of the cyclonic separation cylinder, and sends the clean air from cyclonic separation cylinder 404 to air passage 420 provided under cyclonic separation cylinder 404 through inner cylinder 431. The dirty air carried into the dust collecting case 405 is filtered by first auxiliary filter 406. The filtered air is sucked into the motor-driven blower through air outlet 446 of the cyclonic separator (behind first auxiliary filter 406) and second auxiliary filter 412.

At the same time, the clean air passing through cyclonic separation cylinder 404 is also sucked into the motor-driven blower through the air outlet 420, and air passage 445 together with the clean air from dust collecting case 405. The air blown out from the motor-driven blower is filtered and discharged to the outside of the cleaner body.

The components are so energized that air inlet port 415 of cyclonic separation cylinder 404 may be in airtight contact with hose connection port 416, that air outlet 420 under cyclonic separation cylinder 404 may be in airtight contact with air passage 445, and that outlet 446 of cyclonic separation cylinder 104 may be in airtight contact with filter casing 413 containing second auxiliary filter 412.

An elastic material is provided between dust collector lid 461 and each of cyclonic separation cylinder 404 and dust collecting case 405 so that they may be in airtight contact with each other when a vertical force is applied thereto. Further, elastic sealing member 450 is provided between the inlet of the motor-driven blower and cleaner body 301 to make them in airtight contact with each other. The above airtightness becomes perfect when a vertical force is applied thereto. In other words, this airtightness is assured when the user pushes down dust collector 460 against vacuum cleaner 301 and fastens the dust collector down to the cleaner body with fasteners (not shown). This prevents leaking of dust and air. Elastic sealing member 450 also works to support second auxiliary filter 412 on dust collector lid 461

The axis of cyclonic separation cylinder 404 is not vertical but slanted a little. With this, the longitudinal length of cyclonic separation cylinder 404 can be made greater and the dust collection performance can be increased without increasing the height of cleaner body 301.

The user can take out cyclonic separation cylinder 404 and dust collecting case 405 from cleaner body 301 by pull-out handle 423.

First auxiliary filter 406 and auxiliary filter casing 440 are provided on the exhaust side of dust collecting case 405 and net filter 406*a* is insert-mounted on the opening of auxiliary filter casing 440.

The back of first auxiliary filter 406 is supported by dust collector lid 461 having a filter support that comprises a plurality of rectangular openings filled with filter 406*b*.

The dust collector lid 461 also makes the edges of first auxiliary filter 406 and auxiliary filter casing 440 airtight.

Dust collector lid 461 is provided under first auxiliary filter 406 and air outlet 420 of the cyclonic separation cylinder. The whole inside of the dust collector lid 461 is filled with second auxiliary filter 412 supported by filter frame 413.

First auxiliary filter 406 is preferably made of sponge or other material that can capture a lot of dust. Washable sponge materials made from ether are more preferable in handling. When treated by antistatic agent, net filter 406*a* before first auxiliary filter 406 can knock off dust easily and make dust disposal easier. Filter 406 attached to dust collector lid 461 can prevent leaking of dust from dust collecting case 405 when it is of a nonwoven or net filter type. For easy handling, filter 406 made of a nonwoven material or the like is insert-mounted with dust collector lid 461 in a body.

Preferably, second auxiliary filter 412 can be a pleated nonwoven filter. As this filter supports the whole lower part of cyclonic dust collector 460, the filtering area can be made greater and consequently the air flow resistance can be reduced. Further, as the air can be directly flown to the motor-driven blower, the air flow resistance can be reduced and as the result, the suction power can be increased.

First auxiliary filter 406 is provided on the bottom of dust collecting case 405 far away from communicating port 417. In other words, communicating port 417 is on the upper right corner of FIG. 17 and first auxiliary filter 406 is on the lower left corner of FIG. 17. The dirty air passing through communicating port 417 is apt to flow to the lower left part as it is sucked from the side of first auxiliary filter 406. Dust in the dirty air is accumulated and compressed from the lower left side of dust collecting case 405. Therefore, more dust can be accumulated in dust collecting case 405. Further, as first auxiliary filter 406 is provided on the bottom of dust collecting case 405, dust in the dust collecting case is compressed by its weight and more dust can be accumulated in the dust collecting case. Consequently, this reduces a dust dumping frequency. Further this mechanism has a feature of preventing fine dust from rising up when the accumulated dust is disposed of as fine particles such as lint, sands, and soil in dust are caught up in dust layers.

When dust collector 460 is mounted on cleaner body 401, cyclonic separation cylinder 404 is behind dust collecting case 405 (when viewed from the front of the electric vacuum cleaner).

As communicating port 417 and upper opening 418 of dust collecting case 405 are provided before the cyclonic separation cylinder, a dust indicator line (not shown) can be marked on the front side opposite to upper opening 418 so that the user can know proper timing to dump the dust. The dust indicator line is marked aslant because the dust accumulates thinner near upper opening 418.

For dust disposal, dust collector lid 461 is opened. As dust collecting case 405 is wider towards the bottom, it is very easy to empty dust collecting case 405 completely and almost no dust will remain in dust collecting case 405.

When filters are clogged, the user takes steps of opening dust collector lid 461 and auxiliary filter casing 440, taking out the first auxiliary filter, wash it, drying it by air seasoning, then remounting the dry filter. To clean second auxiliary filter 412, the user takes steps of taking the second auxiliary filter together with auxiliary filter frame 413, wash them, drying them by air seasoning, then remounting the dry filter together with the filter frame.

It is also possible to mount inner cylinder 431 on dust collector lid 461 and make it open together when dust collector lid 461 is closed for disposal of dust. This mechanism facilitates disposal of dust that overloaded from dust collecting case 405 into cyclonic separation cylinder 404 when dust collecting case 405 is overloaded.

The inner surfaces of cyclonic separation cylinder 404 and dust collecting case 405 are coated with UV curing clear resin, to protect the surfaces against damages due to collision and scratches by dust particles that flow into cyclonic separation cylinder 404 and dust collecting case 405 and against contamination. This coat increases the friction resistance and contamination resistance of the surfaces. Therefore, even when outer cylinder 435 of cyclonic separation cylinder 404 and dust collecting case 405 are made of clear plastic materials, the quantity of dust in the cylinder and the case can be easily recognized by eyes.

When cyclonic separation cylinder 404 and dust collecting case 405 are molded with antistatic materials or when surfaces thereof are coated with antistatic materials, the cyclonic separation cylinder and the dust collecting case become less contaminated and consequently, they need not be cleaned so frequently.

Outer cylinder 435 of cyclonic separation cylinder 404 has air inlet port 415 on the lower part of the cylinder (below the center of the longitudinal center axis of the cylinder) to introduce dirty air approximately tangentially to cyclonic separation cylinder 404 which is approximately cylindrical. Therefore, hose connection port 416 can be provided below cleaner body 301, which can make hose 302 shorter. This can also reduce frictional losses and so on.

Communicating port 417 is provided on the upper part (above the center) of cyclonic separation cylinder 404 to introduce dirty air into dust collecting case 405. Inner cylinder 431 is provided below cyclonic separation cylinder 404 and communicates with air outlet 420 thereunder. As air outlet 420 can be provided below the cyclonic separation cylinder, the air passage towards the motor-driven blower can be made shorter. This configuration can make cleaner body 301 shorter, compactor, and less weight. This also has an effect to reduce frictional losses.

Inner cylinder 431 comprises partition wall 432 and cylindrical member 434 with which net filter 433 made of plastic fiber is formed in a body by insert-mounting. Net filter 433 can be formed on the wall of the cylindrical member or on the top of the cylindrical member. In this embodiment, the net filter 433 is not formed on the whole periphery of the wall of inner cylinder 431. Net filter 433 and the opening are not provided in a 90-degree area of the inner cylinder near air inlet port 415. This prevents long dust particles such as hairs (sent from air inlet port 415) from directly hitting net filter 433, sticking into the net filter or being twined around with the net filter. Similarly, when air inlet port 415 is curved upward, this prevents sharp-pointed materials such as pins and needles (sent from air inlet port 415) from directly hitting net filter 433, breaking the net filter, and leaking. Further, a plurality of ribs are provided on the inner side of the cylinder to support the net filter because net filter 433 receives a centripetal force.

When net filter 433 is treated with antistatic agent, dust on the net filter can be easily knocked off and cleaned.

Embodiment 4

A fourth preferred embodiment of the present invention is described below with reference to FIG. 19.

Figure 19:
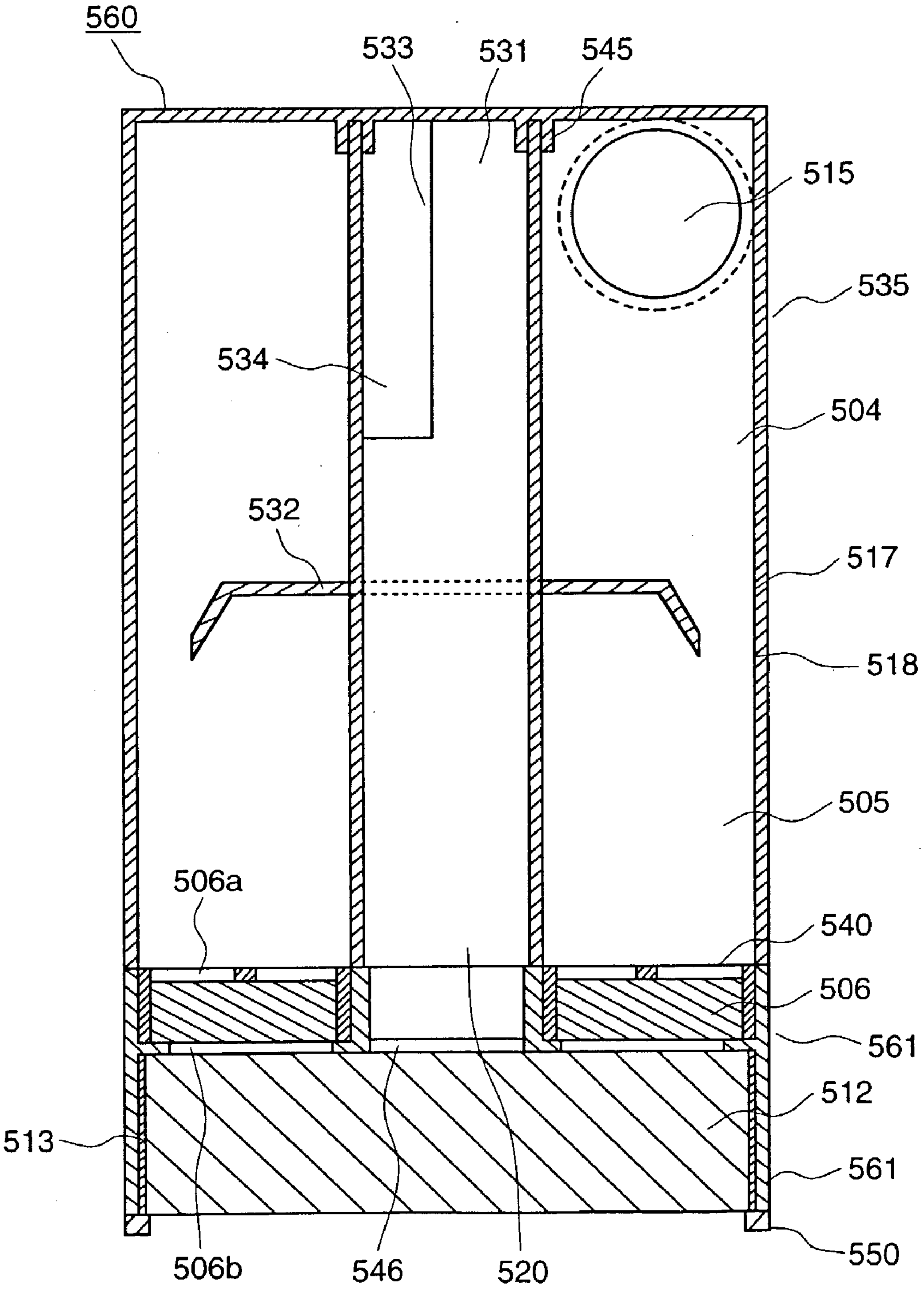
FIG. 19 is a vertical cross-sectional view of a combination of cyclonic separation cylinder 404 and dust collecting case 405 which is an embodiment of the present invention.

FIG. 19 is a vertical cross-sectional view of a cyclonic dust collector 560 comprising a cyclonic separation cylinder 504 and a dust collecting case 505 which is an embodiment of the present invention.

The cyclonic separation section comprises cyclonic separation cylinder 504 which is approximately cylindrical, dust collecting case 505, and filter casing 513 which is under the dust collecting case. This cyclonic separation section is mounted on the cleaner body detachably. The motor-driven blower is provided under this cyclonic separation section. Air inlet port 515 is formed in a body on cyclonic separation cylinder 504 to introduce air into cyclonic separation cylinder 504 along the periphery of the cylinder. Air inlet port 515 is circular in the section but can be rectangular with rounded corners.

Dust collecting case 505 is provided in a body under cyclonic separation cylinder 504. The inner cross-section of the cyclonic separation section becomes greater as you go from cyclonic separation cylinder 504 to dust collecting case 505. In other words, the cyclonic separation section becomes wider as you go downward. The dust collecting case 505 has a circular cross-section but can have a rectangular cross-section with rounded corners.

Inner cylinder 531 comprises cylindrical member 534 having a circular cross-section, downward-curved partitioning wall which separates cyclonic separation cylinder 504 from dust collecting case 504 and an opening on the upper part. Net filter 533 is formed in a body on the opening by insert-molding.

The upper end of inner cylinder 531 is fit to cylinder-fixing rib 531 which is formed in a body on cyclonic separation cylinder 504. This rib has a mechanism (not shown) to fasten the inner cylinder in an air-tight state when the inner cylinder is fit into the rib and turned. The lower part of inner cylinder 531 has air outlet 520 to discharge air from the cyclonic separation cylinder 504.

The cyclonic separation section has dust collector lid 561 comprising filter casing 513 and others on its bottom.

The dust collector lid 561 has first auxiliary filter 506 and filter frame 540 that covers the first auxiliary filter on the upper part of the dust collector lid 561. The filter frame contains net filter 406*a* in a body by insert-molding. Filter frame 540 has an approximately circular section in its center.

The dust collector lid 561 contains filter casing 513 which holds second auxiliary filter 512. The filter casing 513 is in close contact with dust collecting case 505. The upper part of filter casing 513 comprises a partitioning wall having a lot of openings and a cylindrical section to be fit to inner cylinder 531 in the center thereof. The partitioning wall contains net filter 406*a* in a body by insert-molding. The partitioning wall supports the first auxiliary filter and filter frame 540 is detachably mounted thereon. Dust collector lid 561 has, on its bottom edge, an elastic member in close contact with the opening at the entrance of the motor-driven blower. This elastic member also works to hold second auxiliary filter 512.

When the cyclonic separation section is mounted on the cleaner body, the dust collector lid 561 is strongly pressed by the partitioning wall having the opening in the entrance of the motor-driven blower.

The air-tightness between dust collector lid 561 and each of dust collecting case 505 and inner cylinder 531 is assured by means of an elastic sealing member therebetween when a vertical force is applied. This can prevent leaking of dust and air.

Next will be explained how air and dust flow through the electric vacuum cleaner of this embodiment.

Dirty air is introduced from air inlet port 515 into cyclonic separation cylinder 504, and made to swirl there to centrifugally separate dust from the air. The separated dust is delivered into dust collecting case 505 through communicating port 517. The clean air from cyclonic separation cylinder 504 is sucked into inner cylinder 531 through net filter 533 on the upper part of inner cylinder 531 and sent toward dust collector lid 561 through air outlet 520 provided on the bottom of cyclonic separation cylinder 504.

Further part of air is sucked into dust collecting case 505 through communicating port 517 formed outside of partitioning wall 532 of inner cylinder 531 and de-dusted by first auxiliary filter 506. The clean air from dust collecting case 505 passes through net filter **506*b* under first auxiliary filter 506, and flows into the second auxiliary filter together with air from the cylindrical member formed in the center of filter casing 513. These two air passages forms outlet 546 of the dust separation cyclone. The clean air passing through second auxiliary filter 512** is sucked into the motor-driven blower.

Cyclonic dust collector 560 is equipped with a pull-out handle (not shown) by which the user can take out the dust collector from the cleaner body. For disposal of dust, the user opens dust collector lid 561 under dust collecting case 505 and dumps dust collecting case 505. As the dust collecting case 505 becomes wider downward, dust in dust collecting case 505 is apt to fall to the bottom and dust can hardly remain in dust collecting case 505.

As first auxiliary filter 506 is provided under dust collecting case 605 to pass air, the flow resistance increases as dust accumulates further. With this, the dust in dust collecting case 505 is compressed. Further as first auxiliary filter 506 is on the bottom of dust collecting case 505, dust is further compressed by its weight. Therefore, much more dust can be accumulated in dust collecting case 505 and the dust dumping frequency can be made smaller. Further as fine particles such as lint, sands, and soil in dust are caught up in dust layers, rise up of fine dust can be suppressed when the dust is disposed of.

The user can clean cyclonic separation cylinder 504 (when it is dirty) after taking out inner cylinder 531. This also enables the user to clean net filter 533 of inner cylinder 531.

Further, the user can wash and clean first auxiliary filter 506 after taking the filter from filter frame 540. The first auxiliary filter is made of washable foamed materials such as urethane sponge.

It is possible to simplify the air passages, reduce the height of the cleaner body, and make the cleaner body smaller and less weight by introducing air from cyclonic separation cylinder 504 into inner cylinder 531 and flowing air linearly to air outlet 520 therebelow (than those designed to introduce air from the inner cylinder downward through the outside of cyclonic separation cylinder 504). This mechanism can eliminate flow bending, loss due to air disturbance, and loss due to friction. Consequently, this mechanism has an effect of increasing the suction power.

Net filter 538 on the opening of part 534 of inner cylinder 531 does not cover the whole cylindrical part 534. The cylindrical part of about 90 degrees near air inlet port 515 is formed with the wall of the cylindrical part 534. This prevents long dust particles such as hairs (sent from air inlet port 515) from directly hitting net filter 533, sticking into the net filter or being twined around with the net filter. Similarly, this prevents sharp-pointed materials such as pins and needles (sent from air inlet port 515) from directly hitting net filter 533, breaking the net filter, and leaking.

As already explained, the present invention can provide a small and easy-to-operate cyclonic separation type dust collector by comprising a cyclonic separation cylinder that swirls air upwards and a dust collecting case that contains filters.

In accordance with the present invention, the center axis of the cyclonic separation cylinder is moved a little away from the center of the cleaner body and a motor-driven blower is placed opposite to the cyclonic separation cylinder. This can make the cleaner body shorter.

Further in accordance with the present invention, a cyclonic separation cylinder which takes in dirty air from downwards and discharges clean air downwards and flowing part of clean air into a dust collecting case having a filter can provide a small easy-to-operate cyclonic separation type dust collector of high dust-capturing performance.

What is claimed is:

1. An electric vacuum cleaner comprising:

an electric vacuum cleaner main body within which an electrically driven blower is installed;

a cyclonic separation cylinder provided in said vacuum cleaner main body for flowing dust-containing air sucked from a suction port into an inlet tube and removing the dust according to centrifugal separation;

an inner cylinder provided in said cyclonic separation cylinder and having an exhaust air port;

a dust collecting case provided in said electric vacuum cleaner main body and having an opening which communicates with said cyclonic separation cylinder and for receiving dust which has been separated in the cyclonic separation cylinder;

a filter arranged in said dust collecting case; and a communicating passage formed separately from said cyclonic separation cylinder and said dust collecting case and for communicating with said exhaust air port;

wherein after air passed through said filter and air blown out from said communicating passage have merged, said merged air is sucked into said electrically driven blower.

2. An electric vacuum cleaner comprising a cyclonic separation cylinder which takes in dirty air from a floor nozzle and centrifugally separates dust therefrom, wherein said cyclonic separation cylinder has its center axis approximately vertical to a floor during cleaning the floor and contains an air outlet, on a lower part of said cyclonic separation cylinder, to discharge air that is taken in from the lower part of said cyclonic separation cylinder and de-dusted in said cyclonic separation cylinder, and a communicating port with a dust collecting case placed beside said cyclonic separation cylinder on the upper part of said cyclonic separation cylinder and wherein said dust collecting case contains a filter and an air passage is provided to merge air passing through said filter with air coming from said air outlet.

3. The electric vacuum cleaner in accordance with claim 1 or 2, wherein a means for opening and closing said filter is provided to dump dust from said dust collecting case.

4. The electric vacuum cleaner in accordance with claim 1 or 2, wherein said cyclonic separation cylinder and said dust collecting case are mounted detachably.

5. An electric vacuum cleaner comprising:

a cyclonic separation cylinder which centrifugally separates dust from dirty air;

a dust collecting case which communicates with said cyclonic separation cylinder through a communication port formed on said cyclonic separation cylinder, said dust collecting case containing a filter;

an air passage provided under the air outlet of the cyclonic separation cylinder to merge air passing through said filter with air coming from the air outlet of said cyclonic separation cylinder;

wherein said cyclonic separation cylinder has an air outlet, on a lower part of said cyclonic separation cylinder, to discharge air that is taken in from the lower part of said cyclonic separation cylinder and de-dusted in said cyclonic separation cylinder, a communicating port with said dust collecting case placed beside said cyclonic separation cylinder on the upper part of said cyclonic separation cylinder, and means for opening and closing said filter for disposal of the accumulated dust.

6. An electric vacuum cleaner comprising:

an electric vacuum cleaner main body within which an electrically driven blower is installed;

a cyclonic separation cylinder provided in said vacuum cleaner main body for flowing dust-containing air sucked from a suction port into an inlet tube and removing the dust according to centrifugal separation;

an inner cylinder provided in said cyclonic separation cylinder and having an exhaust air port;

a dust collecting case provided in said electric vacuum cleaner main body and having an opening which communicates with said cyclonic separation cylinder;

a filter arranged in said dust collecting case; and a communicating passage formed separately from said cyclonic separation cylinder and said dust collecting case and for communicating with said exhaust air port;

wherein after air passed through said filter and air blown out from said communicating passage have merged, said merged air is sucked into said electrically driven blower, and an area of said exhaust air port, in which said air has passed through said filter and is exhausted from said dust collecting case, is larger than an area of an exhaust port of said cyclonic separation cylinder.

7. An electric vacuum cleaner comprising:

an electric vacuum cleaner main body within which an electrically driven blower is installed;

a cyclonic separation cylinder provided in said vacuum cleaner main body for flowing dust-containing air sucked from a suction port into an inlet tube and removing the dust according to centrifugal separation;

an inner cylinder provided in said cyclonic separation cylinder and having an exhaust air port;

a dust collecting case provided in said electric vacuum cleaner main body and having an opening which communicates with said cyclonic separation cylinder;

a filter arranged in said dust collecting case; and a communicating passage formed separately from said cyclonic separation cylinder and said dust collecting case and for communicating with said exhaust air port;

wherein after air passed through said filter and air blown out from said communicating passage have merged, said merged air is sucked into said electrically driven blower, wherein said cyclonic separation cylinder is formed with a substantially cylindrical shape, and wherein said inlet tube of said cyclonic separation cylinder is arranged at a position where air flows in a substantially tangential direction to said cyclonic separation cylinder.

* * * * *